United States Patent
Hiraren et al.

(10) Patent No.: US 12,428,517 B2
(45) Date of Patent: Sep. 30, 2025

(54) MOISTURE CURABLE POLYURETHANE COMPOSITION AND LAMINATE

(71) Applicant: TOKUYAMA CORPORATION, Yamaguchi (JP)

(72) Inventors: Toshimitsu Hiraren, Yamaguchi (JP); Taichi Hanasaki, Yamaguchi (JP); Katsuhiro Mori, Yamaguchi (JP); Junji Takenaka, Yamaguchi (JP); Junji Momoda, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 517 days.

(21) Appl. No.: 17/802,496

(22) PCT Filed: Feb. 26, 2021

(86) PCT No.: PCT/JP2021/007325
§ 371 (c)(1),
(2) Date: Aug. 25, 2022

(87) PCT Pub. No.: WO2021/172513
PCT Pub. Date: Sep. 2, 2021

(65) Prior Publication Data
US 2023/0088268 A1    Mar. 23, 2023

(30) Foreign Application Priority Data

Feb. 28, 2020 (JP) ................................ 2020-033967
Aug. 6, 2020 (JP) ................................ 2020-134225

(51) Int. Cl.
| B32B 27/40 | (2006.01) |
| B32B 7/023 | (2019.01) |
| B32B 27/18 | (2006.01) |
| C08G 18/10 | (2006.01) |
| C08G 18/30 | (2006.01) |
| C08G 18/32 | (2006.01) |

(52) U.S. Cl.
CPC ........... *C08G 18/307* (2013.01); *B32B 7/023* (2019.01); *B32B 27/18* (2013.01); *B32B 27/40* (2013.01); *C08G 18/10* (2013.01); *C08G 18/3203* (2013.01); *B32B 2250/03* (2013.01); *B32B 2250/24* (2013.01)

(58) Field of Classification Search
CPC ... C08G 18/307; C08G 18/10; C08G 18/3203
See application file for complete search history.

(56) References Cited

U.S. PATENT DOCUMENTS

| 2006/0269741 A1 | 11/2006 | Izumi et al. |
| 2008/0241372 A1 | 10/2008 | Tahara et al. |
| 2009/0316246 A1* | 12/2009 | Asai .................. B29D 11/0073 427/508 |
| 2013/0015416 A1 | 1/2013 | Takenaka et al. |
| 2013/0215488 A1* | 8/2013 | Hiraren .................... C09K 9/02 252/586 |
| 2014/0107314 A1* | 4/2014 | Kawato ................ C08G 18/242 528/226 |
| 2014/0340727 A1 | 11/2014 | Mori et al. |
| 2020/0231840 A1* | 7/2020 | Momoda .................. C09D 7/63 |

FOREIGN PATENT DOCUMENTS

| CN | 1950472 A | 4/2007 |
| CN | 103080269 A | 5/2013 |
| CN | 110770611 A | 2/2020 |
| JP | 2005-199683 A | 7/2005 |
| JP | 2019-164271 A | 9/2019 |
| WO | 2004/078476 A1 | 9/2004 |
| WO | 2005/087882 A1 | 9/2005 |
| WO | 2008/001578 A1 | 1/2008 |
| WO | 2011/125956 A1 | 10/2011 |
| WO | 2012/018070 A1 | 2/2012 |
| WO | 2012/176439 A1 | 12/2012 |
| WO | 2013/099640 A1 | 7/2013 |
| WO | 2015/054036 A1 | 4/2015 |
| WO | 2018/230513 A1 | 12/2018 |

OTHER PUBLICATIONS

International Search Report issued in corresponding International Application No. PCT/JP2021/007325, mailed Apr. 13, 2021 (6 pages).
Written Opinion issued in corresponding International Application No. PCT/JP2021/007325, mailed Apr. 13, 2021 (4 pages).

* cited by examiner

*Primary Examiner* — Michael L Leonard
(74) *Attorney, Agent, or Firm* — Osha Bergman Watanabe & Burton LLP

(57) ABSTRACT

Provided is a moisture curable polyurethane composition that is a moisture curable polyurethane having an isocyanate group on one end of a molecule thereof. The moisture curable polyurethane composition contains a moisture curable polyurethane (A) and an organic solvent (B). The moisture curable polyurethane (A) is obtainable by reacting a polyisocyanate compound having at least two isocyanate groups in a molecule thereof (A1) with a low-molecular weight polyol compound having at least two hydroxyl groups in a molecule thereof and having a number average molecular weight of 50-300 (A2). Also provided is a laminate including an optical substrate and a polyurethane resin layer comprising the moisture curable polyurethane composition.

5 Claims, No Drawings

MOISTURE CURABLE POLYURETHANE COMPOSITION AND LAMINATE

TECHNICAL FIELD

The present invention relates to a moisture curable polyurethane composition, and a laminate including a layer formed from the composition.

BACKGROUND ART

Photochromic compounds typified by chromene compounds, fulgide compounds, spirooxazine compounds, and the like, have properties (photochromic properties) of changing their colors rapidly through irradiation with light including ultraviolet light, such as sunlight and light from a mercury lamp, and returning to their original colors when they are put in the dark by stopping the irradiation with light, and are used for various purposes, in particular, optical materials using the above properties.

For example, photochromic spectacle lenses provided with photochromic properties by using a photochromic compound function as sunglasses that are quickly colored outdoors through irradiation with light including ultraviolet light such as sunlight, and as ordinary transparent eyeglasses which are faded indoors where there is no irradiation. In recent years, demand thereof has been growing.

Examples of methods for manufacturing photochromic optical articles such as photochromic spectacle lenses include a method of directly molding an optical article such as lenses by mixing a polymerizable monomer and a photochromic compound with each other, and polymerizing the mixture; a method of coating a surface of an optical article such as plastic lens with a resin layer including photochromic compounds dispersed therein; a method of joining two optical articles with an adhesion layer including an adhesive resin in which photochromic compounds are dispersed; and the like (see Patent Documents 1 to 3). Among them, the method of coating a surface of an optical article such as plastic lens with a resin layer including photochromic compounds dispersed therein is preferably used.

The photochromic optical article manufactured by the above-mentioned method is required to quickly respond and color at a high concentration through irradiation with light including ultraviolet light such as sunlight, and quickly fade indoors where the above light is not present. Furthermore, excellent photochromic properties have been required to be expressed.

As the technique thereof, in the method of coating a surface of the optical article such as plastic lens with a resin layer including photochromic compounds dispersed therein, a technique of imparting flexibility without firmly curing the resin layer including photochromic compounds dispersed therein, and a technique of improving light responsiveness and fading speed by reducing surface rigidity of the resin layer including photochromic compounds dispersed therein (see Patent Document 4).

In general, after a photochromic optical article such as photochromic spectacle lens is manufactured, the article is wrapped in a relatively soft material called inner paper so as not to damage the lens surface, and then put in a bag and shipped. The photochromic spectacle lens is stored and transported in a special-purposed tray or a cleaning rack in order to obtain a defect-free lens surface in each manufacturing steps, storage, and shipment, and therefore, a protective film is attached to the lens surface. This is carried out for preventing damage and dust adhesion in the surface. In addition, since photochromic spectacle lenses are usually transparent, it is difficult to instantly discriminate whether or not a protective film is attached. For this reason, a colored protective film which can be easily discriminated is usually used.

In the above-mentioned shipment and manufacturing process of photochromic spectacle lenses, in the photochromic spectacle lenses having reduced surface rigidity as in Patent Document 4, there was a room for improvement because the surface rigidity of a resin layer including photochromic compounds dispersed therein is not sufficient and the lens surface was easily damaged. Furthermore, when a colored protective film is attached to a photochromic spectacle lens, there was also room for improvement in the point that a coloring agent of a colored protective film is transferred to a lens surface, initial transparency and color tone of the photochromic spectacle lens were sometimes damaged.

On the other hand, when a functional layer having photochromic performance or ultraviolet absorption performance is laminated on the surface of an optical article such as a plastic lens, the functional layer is laminated via a primer layer in order to improve adhesion. For example, a method of using a moisture curable coating composition as a primer layer during coating a surface of the optical article such as plastic lens with a resin layer including photochromic compounds dispersed therein, and a method of laminating a moisture curable coating composition as the primer layer having ultraviolet absorption performance on a surface of the optical article such as plastic lens, and the like, are proposed (see Patent Documents 6 and 7).

However, when the moisture curable coating composition is used as the primer layer, depending on types of optical base materials such as a plastic lens, there was room for improvement because appearance defects and poor adhesion may occur due to dissolution or penetration by the coating liquid applied on the primer layer. Furthermore, when a pretreatment is performed for laminating a further layer after laminating a moisture curable coating composition as a primer layer on an optical base material such as a plastic lens, the primer layer may be damaged by wiping with a wipe, or the primer layer may be dissolved by immersion in a cleaning solution, thus there were problems and room for improvement.

Patent Document 1: PCT International Publication No. WO2012/176439
Patent Document 2: PCT International Publication No. WO2011/125956
Patent Document 3: PCT International Publication No. WO2013/099640
Patent Document 4: PCT International Publication No. WO2008/001578
Patent Document 5: PCT International Publication No. WO2015/054036
Patent Document 6: PCT International Publication No. WO2004/078476
Patent Document 7: PCT International Publication No. WO2018/230513

DISCLOSURE OF THE INVENTION

Problems to be Solved by the Invention

With respect to problems such as damage of a photochromic layer, a method of laminating a layer of thermosetting epoxy resin on a surface of a resin layer including photochromic compounds dispersed therein, or the like, has been proposed (see, Patent Document 5). According to this method, since a further layer is laminated on the surface of the resin layer including photochromic compounds dispersed therein, damage can be further suppressed.

However, according to the study by the present inventors, even by the method described in Patent Document 5, there was room for improvement that adhesion becomes insufficient, cracks occur, and appearance defects occur during production.

The present invention has an object to provide a moisture curable polyurethane composition to be suitably used for forming a protective layer after forming a resin layer (hereinafter, also referred to as "photochromic resin layer") including photochromic compounds dispersed therein on a surface of an optical base material, or forming a primer layer before forming a photochromic resin layer on a surface of the optical base material, and a laminate including a polyurethane resin layer formed from the moisture curable polyurethane composition.

Means for Solving the Problems

Specific means for solving the above-mentioned problems include the following embodiments.
<1> A moisture curable polyurethane composition containing a moisture curable polyurethane (A), and an organic solvent (B),
the moisture curable polyurethane (A) being a moisture curable polyurethane having an isocyanate group at the end of a molecule thereof, the moisture curable polyurethane being obtained by reacting a polyisocyanate compound (A1) having two or more isocyanate groups in a molecule thereof with a low molecular weight polyol compound (A2) having two or more hydroxy groups in a molecule thereof and having a number average molecular weight of 50 to 300.
<2> The moisture curable polyurethane composition as described in <1>, in which the polyisocyanate compound (A1) having two or more isocyanate groups in a molecule thereof is an aromatic polyisocyanate compound having two or more isocyanate groups in a molecule thereof.
<3> The moisture curable polyurethane composition as described in <1>, in which the polyisocyanate compound (A1) having two or more isocyanate groups in a molecule thereof is a moisture curable polyurethane having an isocyanate group at the end of a molecule thereof, the polyisocyanate compound (A1) being obtained by reacting a polyisocyanate compound (A1-1) having two or more isocyanate groups in a molecule thereof and having a molecular weight of 400 or less with a high molecular weight polyol compound (A1-2) having two or more hydroxy groups in a molecule thereof and having a number average molecular weight of 300 to 5000.
<4> The moisture curable polyurethane composition as described in any one of <1> to <3>, in which the organic solvent (B) is an organic solvent having a solubility parameter of 8 [(cal/cm$^3$)$^{1/2}$] or more and has no active hydrogen.
<5> The moisture curable polyurethane composition as described in any one of <1> to <4>, in which the moisture curable polyurethane (A) is a moisture curable polyurethane having an isocyanate group at the end of a molecule thereof, the moisture curable polyurethane (A) being obtained by further reacting at least one selected from a polyol compound (A3) having two or more hydroxy groups in a molecule thereof and having a number average molecular weight of 400 to 2000 and an amine compound (A4) having one or more amino groups in a molecule thereof.
<6> A laminate including an optical base material and a polyurethane resin layer formed from the moisture curable polyurethane composition as described in any one of <1> to <5>.
<7> The laminate as described in <6>, further including a photochromic resin layer, wherein an order of lamination is the photochromic resin layer, the polyurethane resin layer, and the optical base material.
<8> The laminate as described in <6>, further including a photochromic resin layer, wherein an order of lamination is the polyurethane resin layer, the photochromic resin layer, and the optical base material.

Effects of the Invention

The present invention can provide a moisture curable polyurethane composition to be suitably used for forming a protective layer after forming a photochromic resin layer on a surface of an optical base material, or forming a primer layer before forming a photochromic resin layer on a surface of the optical base material, and a laminate including a polyurethane resin layer formed from the moisture curable polyurethane composition. In particular, use of the moisture curable polyurethane composition for forming the protective layer makes it possible to provide a photochromic optical article having good photochromic properties and capable of suppressing transfer of a coloring agent of a colored protective film or damages on a surface, and having good adhesion. Furthermore, use of the moisture curable polyurethane composition for forming the primer layer makes it possible to provide an optical article having good adhesion in which a functional layer is laminated without making appearance defects on the polyurethane resin layer.

PREFERRED MODE FOR CARRYING OUT THE INVENTION

«Moisture Curable Polyurethane Composition»

The moisture curable polyurethane composition according to this embodiment contains a moisture curable polyurethane (A) (hereinafter, also referred to as a "component A"), and an organic solvent (B) (hereinafter, also referred to as a "component B"). The moisture curable polyurethane (A) is a moisture curable polyurethane having an isocyanate group at the end of the molecule, the moisture curable polyurethane (A) being obtained by reacting a polyisocyanate compound (A1) having two or more isocyanate groups in a molecule thereof with a low molecular weight polyol compound (A2) having two or more hydroxy groups in a molecule thereof and having a number average molecular weight of 50 to 300. Hereinafter, each component will be described.

<(A) Moisture Curable Polyurethane>

A moisture curable polyurethane (A) is a moisture curable polyurethane having an isocyanate group at the end of the molecule, and the moisture curable polyurethane is obtained by reacting a polyisocyanate compound (A1) having two or more isocyanate groups in a molecule thereof (hereinafter, also referred to as a "component A1") with a low molecular weight polyol compound (A2) having two or more hydroxy groups in a molecule thereof and having a number average molecular weight of 50 to 300 (hereinafter, also referred to as a "component A2").

In the moisture curable polyurethane (A), in order to make an isocyanate group be at the end of the molecule, to suppress a ratio of an amount of soft segment included in a molecule chain of the polyurethane resin, and to increase a ratio of an amount of a hard segment, it is preferable that n1:n2=1:0.15 to 0.70 is satisfied when n1 denotes the number of moles of the isocyanate group included in the component A1, and n2 denotes the number of moles of the hydroxy group included in the component A2.

Furthermore, the moisture curable polyurethane (A) may be a moisture curable polyurethane having an isocyanate group at the end of the molecule, the moisture curable polyurethane being obtained by further reacting at least one selected from a polyol compound (A3) having two or more hydroxy groups in a molecule thereof and having a number average molecular weight of 400 to 2000 (hereinafter, also referred to as a "component A3") and an amine compound (A4) having one or more amino groups in a molecule thereof (hereinafter, also referred to as a "component A4") other than the component A1 and the component A2.

[(A1) Polyisocyanate Compound Having Two or More Isocyanate Groups in Molecule Thereof]

The component A1 is polyisocyanate compounds having two or more isocyanate groups in a molecule thereof, and among them, preferably, a polyisocyanate compound (A1-1) having two or more isocyanate groups in a molecule thereof and having a molecular weight of 400 or less (hereinafter, also referred to as a "component A1-1") and/or a urethane prepolymer obtained by reacting a component A1-1 with a high molecular weight polyol compound (A1-2) having two or more hydroxy groups in a molecule thereof and having a number average molecular weight of 300 to 5000 (hereinafter, also referred to as a "component A1-2") and having an isocyanate group at the end of the molecule (hereinafter, also referred to as a "component A1-1").

(Polyisocyanate Compound (A1-1) Having Two or More Isocyanate Groups in Molecule Thereof and Having Molecular Weight of 400 or Less)

The component A1-1 is not particularly limited as long as it is a polyisocyanate compound having two or more isocyanate groups in a molecule thereof and having a molecular weight of 400 or less. In the component A1, one type may be used singly or two or more types may be used in combination.

Examples of the component A1-1 suitably usable include aliphatic diisocyanate compounds such as tetramethylene-1,4-diisocyanate, hexamethylene-1,6-diisocyanate, octamethylene-1,8-diisocyanate and 2,2,4-trimethylhexane-1,6-diisocyanate; alicyclic diisocyanate compounds such as cyclobutane-1,3-diisocyanate, cyclohexane-1,3-diisocyanate, cyclohexane-1,4-diisocyanate, 2,4-methylcyclohexyl diisocyanate, 2,6-methylcyclohexyl diisocyanate, isomer mixtures of isophorone diisocyanate, norbornene diisocyanate, isomer mixtures of 4,4'-methylenebis(cyclohexyl isocyanate), hexahydrotoluene-2,4-diisocyanate, hexahydrotoluene-2,6-diisocyanate, hexahydrophenylene-1,3-diisocyanate, hexahydrophenylene-1,4-diisocyanate, 1,9-diisocyanato-5-methylnonane, 1,1-bis(isocyanatomethyl)cyclohexane, 2-isocyanato-4-[(4-isocyanatocyclohexyl)methyl]-1-methylcyclohexane, 2-(3-isocyanatopropyl)cyclohexyl isocyanate and norbornane diisocyanate; and aromatic diisocyanate compounds such as phenyl cyclohexylmethane diisocyanate, isomer mixtures of 4,4'-methylenebis(phenyl isocyanate), toluene-2,3-diisocyanate, toluene-2,4-diisocyanate, toluene-2,6-diisocyanate, phenylene-1,3-diisocyanate, phenylene-1,4-diisocyanate, 1,3-bis(isocyanatomethyl)benzene, m-xylylene diisocyanate, tetramethyl xylylene diisocyanate, naphthalene diisocyanate, diphenyl ether diisocyanate, 1,3-diisocyanatomethyl benzene, 4,4'-diisocyanato-3,3'-dimethoxy(1,1-biphenyl), 4,4'-diisocyanato-3,3'-dimethylbiphenyl, 1,2-diisocyanatobenzene, 1,4-bis(isocyanatomethyl)-2,3,5,6-tetrachlorobenzene, 2-dodecyl-1,3-diisocyanatobenzene, 1-isocyanato-4-[(2-isocyanatocyclohexyl)methyl]2-methylbenzene, 1-isocyanato-3-[(4-isocyanatophenyl)methyl]-2-methylbenzene, 4-[(2-isocyanatophenyl)oxy]phenyl isocyanate and diphenylmethane diisocyanate.

When tolylenediisocyanate is used, from the viewpoint of easy availability of raw materials, it is preferable to use a mixture of tolylene-2,4-diisocyanate (50 to 90% by mass) and tolylene-2,6-diisocyanate (10 to 50% by mass).

Among them, from the viewpoint of forming a rigid hard segment in the molecular chain of the polyurethane resin, an aromatic diisocyanate compound is preferably included as the A1-1 component, and more preferably at least one type selected from tolylene diisocyanate, 4,4-diphenylmethane diisocyanate, and m-xylylene diisocyanate is contained. With such a configuration, when a protective layer is formed using the moisture curable urethane composition according to this embodiment, transfer of the coloring agent from the colored protective film and damage of the surface tend to be further suppressed. Furthermore, when a primer layer is formed using the moisture curable urethane composition according to this embodiment, adhesion between the primer layer and a functional layer laminated on the primer layer is improved, and appearance defects by dissolution and infiltration and the like by the coating liquid forming the functional layer tend to be suppressed.

((A1-2) High Molecular Weight Polyol Compound Having Two or More Hydroxy Groups in Molecule Thereof and Having Number Average Molecular Weight of 300 to 5000)

As the component A1-2, polyether polyol, polyester polyol, polycarbonate polyol, and polycaprolactone polyol are suitably used. In the component A1-2, one type may be used singly or two or more types may be used in combination.

The number average molecular weight of the component A1-2 is required to be 300 to 5000 from the viewpoint of adhesion and durability. Among them, from the viewpoint of suppression of an amount of soft segment included in the molecular chain of the polyurethane resin, the number average molecular weight of the component A1-2 is preferably 300 to 1000, and more preferably 300 to 600. With such a configuration, when the moisture curable urethane composition according to this embodiment is used to form a protective layer, transfer of the coloring agent from the colored protective film and damages on a surface tend to be more suppressed. Furthermore, when the moisture curable urethane composition according to this embodiment is used to form a primer layer, adhesion between the primer layer and a functional layer laminated on the primer layer is improved, and appearance defects such as dissolution and infiltration by the coating liquid forming the functional layer tend to be suppressed.

Furthermore, from the viewpoint that a polyurethane resin layer obtained by polymerization becomes a highly cross-linked product, and appearance defects such as crack do not easily occur, as the component A2, components having 2 to 6 hydroxy groups in a molecule thereof are preferable. In consideration with solubility to an organic solvent, components having 2 to 3 hydroxy groups in a molecule thereof are more preferable.

Hereinafter, a detailed description is given of each compound used as the component A1-2.

(Polyether Polyol)

Examples of the polyether polyol to be used as the component A1-2 include polyether polyol compounds obtained from a reaction between a compound having two or more active hydrogen-containing groups in the molecule and an alkylene oxide, polymer polyols which are modified products of the polyether polyol compounds, urethane modified polyether polyols, polyether ester copolymer polyols, and the like.

Examples of the compound having two or more active hydrogen-containing groups in the molecule include water, ethylene glycol, propylene glycol, butanediol, glycerin, trimethylolpropane, hexane triol, triethanolamine, diglycerin, pentaerythrytol, trimethylolpropane and hexane triol. These may be used singly or in combination of two or more.

Examples of alkylene oxide include cyclic ether compounds such as ethylene oxide, propylene oxide, and tetrahydrofuran. These may be used singly or in combination of two or more.

The polyether polyol is available as a reagent or industrially. Commercially available products of the polyether polyol include the "Excenol (registered trademark)" series and "Emulstar (registered trademark)" series, which are manufactured by AGC, and the "Adeka Polyether" series manufactured by ADEKA Corporation, and the like.

(Polyester Polyol)

Examples of the polyester polyol to be used as A1-2 component include polyester polyols obtained from a condensation reaction between a polyhydric alcohol and a polybasic acid, and the like.

Examples of the above polyhydric alcohol include ethylene glycol, 1,2-propanediol, 1,3-butanediol, 1,4-butanediol, 3-methyl-1,5-pentanediol, 1,6-hexanediol, 3,3'-dimethylolheptane, 1,4-cyclohexane dimethanol, neopentyl glycol, 3,3-bis(hydroxymethyl)heptane, diethylene glycol, dipropylene glycol, glycerin and trimethylol propane. These may be used singly or in combination of two or more.

Examples of the above polybasic acid include succinic acid, adipic acid, azelaic acid, sebacic acid, dodecanedicarboxylic acid, cyclopentanedicarboxylic acid, cyclohexanedicarboxylic acid, orthophthalic acid, isophthalic acid, terephthalic acid, and naphthalene dicarboxylic acid. These may be used singly or in combination of two or more.

These polyester polyols are available as a reagent or industrially. Commercially available products of the polyester polyol include the "POLYLITE (registered trademark)" series manufactured by DIC Corporation, the "Nipporan (registered trademark)" series manufactured by Tosoh Corporation, the "MAXIMOL (registered trademark)" series manufactured by Kawasaki Kasei Chemicals Ltd., the "KURARAY POLYOL (registered trademark)" series manufactured by KURARAY CO., LTD., and the like.

(Polycarbonate Polyol)

Examples of the polycarbonate polyol used as the component A1-2 include polycarbonate polyols obtained through phosgenation of one or more types of low-molecular polyols such as ethylene glycol, 1,2-propanediol, 1,3-propanediol, 2-methyl-1,3-propanediol, 1,2-butanediol, 1,3-butanediol, 1,4-butanediol, 1,5-pentanediol, 1,6-hexanediol, 1,8-octanediol, 1,9-nonanediol, 1,10-decanediol, 3-methyl-1,5-pentanediol, 2-ethyl-4-butyl-1,3-propanediol, diethylene glycol, dipropylene glycol, neopentyl glycol, cyclohexane-1,4-diol, cyclohexane-1,4-dimethanol, dimeric acid diol, ethylene oxide or propylene oxide adduct of bisphenol A, bis((3-hydroxyethyl)benzene, xylylene glycol, glycerin, trimethylolpropane, pentaerythritol; or polycarbonate polyols obtained by transesterifying a low-molecular carbonate such as ethylene carbonate, diethyl carbonate, diphenyl carbonate, or the like.

The polycarbonate polyol is available as a reagent or industrially. Commercially available products thereof include "Duranol (registered trademark)" series manufactured by Asahi Kasei Chemicals Corporation, "Kuraray POLYOL (registered trademark)" series manufactured by Kuraray Co., Ltd., "Placcel (registered trademark)" series manufactured by Daicel Chemical Industries, Ltd., "Nipporan (registered trademark)" series manufactured by Tosoh Corporation, "ETERNACOLL (registered trademark)" series manufactured by Ube Industries, Ltd., and the like.

(Polycaprolactone Polyol)

Examples of polycaprolactone polyol to be used as the component A1-2 include a compound obtained by the ring-opening polymerization of ε-caprolactone.

The polycaprolactone polyol is available as a reagent or industrially. Commercially available products of polycaprolactone polyol include "Placcel (registered trademark)" series manufactured by Daicel Chemical Industries, Ltd.

Among the above components A1-2, from the viewpoint of improving the intermolecular force between molecular chains of the moisture curable urethane resin, polyester polyol and polycarbonate polyol containing an aromatic ring are preferable. With such a configuration, when a protective layer is formed by using the moisture curable urethane composition according to this embodiment, transfer of the coloring agent from the colored protective film or damages on a surface tend to be suppressed. Furthermore, when a primer layer is formed using the moisture curable urethane composition according to this embodiment, adhesion between the primer layer and a functional layer laminated on the primer layer is improved, and appearance defects such as dissolution and infiltration by the coating liquid forming the functional layer tend to be suppressed.

((A1-1') Urethane Prepolymer)

The component A1-1' is a urethane prepolymer obtained by reacting the component A1-1 and the component A1-2, and having an isocyanate group at the end of the molecule.

Since the component A1-1' has an isocyanate group at the end of the molecule, the mole ratio (n3:n4) of the number of moles (n3) of the isocyanate group in the component A1-1 to the number of moles (n4) of the hydroxy group in the component A1-2 is preferably n3:n4 of 1:0.01 to 0.7, and more preferably n3:n4 of 1:0.3 to 0.6.

A method for producing a component A1-1' is not particularly limited, and well-known methods can be employed. For example, a method for reacting the components A1-1 and A1-2 in the presence or absence of an organic solvent, preferably, in an inert gas atmosphere such as nitrogen and argon at a reaction temperature of room temperature (23° C.) to 130° C. can be employed. When the reaction temperature is 130° C. or less, decomposition of the component A1-2 can be suppressed, and a desired urethane prepolymer can be obtained. The reaction time changes depending on the charge ratio of the component A1-1 and the component A1-2, and the reaction temperature, but usually, the reaction time may be set to a range of 0.5 hours to 24 hours. An adding order of the component A1-1 and the component A1-2 when the components are reacted is not particularly limited. The component A1-1 and the component A1-2 can be appropriately additionally added in the middle of the reaction as necessary.

The organic solvent is not particularly limited as long as it is an organic solvent to be used in a prepolymer reaction, and examples thereof include acetone, methyl ethyl ketone, methyl isobutyl ketone, diethyl ketone, cyclohexanone, dioxane, toluene, hexane, heptane, ethyl acetate, butyl acetate, dimethyl formamide (DMF), dimethyl sulfoxide (DMSO), tetrahydrofuran (THF), and the like. These organic solvents may be used as a mixture of two or more organic solvents. Among them, it is preferable to use organic solvents described as the component B described below. In this case, the organic solvent used can be made to be a part of the component B.

The use amount of the organic solvent is preferably 300 parts by mass or less with respect to 100 parts by mass of the total amount of the component A1-1 and the component A1-2. When the use amount of the organic solvent is 300 parts by mass or less, the reaction time becomes appropriate, and decomposition of the component A1-2 can be suppressed.

In production of the component A1-1', a catalyst for prepolymer reaction may be used, and examples of the catalyst include dibutyltin dilaurate, dimethyl imidazole, triethylenediamine, tetramethyl-1,6-hexadiamine, tetramethyl-1,2-ethanediamine, or 1,4-diazabicyclo[2.2.2]octane. The use amount of the catalyst is preferably 0.001 to 3 parts by mass with respect to 100 parts by mass of the total of the component A1-1 and the component A1-2.

Furthermore, in production of the component A1-1', to avoid a reaction between the isocyanate group in the component A1-1 and water as an impurity, the organic solvent, and the catalyst are preferably dehydrated and fully dried in advance.

[(A2) Low Molecular Weight Polyol Compound Having Two or More Hydroxy Groups in Molecule Thereof and Having Number Average Molecular Weight of 50 to 300]

The component A2 is not particularly limited as long as the component is a low molecular weight polyol compound having two or more hydroxy groups in a molecule thereof and having a number average molecular weight of 50 to 300. The component A2 may be used singly or two or more types may be used in combination.

Among them, from the viewpoint of suppressing the ratio of an amount of a soft segment and increasing an amount of a hard segment, the component A2 is preferably a low molecular weight polyol compound having two hydroxy groups in molecule thereof and having a number average molecular weight of 50 to 300. Furthermore, the number average molecular weight of the component A2 is preferably 50 to 200, and more preferably 50 to 100. With such a configuration, when the protective layer is formed using the moisture curable urethane composition according to this embodiment, transfer of the coloring agent from the colored protective film and damages on a surface tend to be more suppressed. Furthermore, when the primer layer is formed using the moisture curable urethane composition according to this embodiment, adhesion between the primer layer and a functional layer laminated on the primer layer is improved, and appearance defects such as dissolution and infiltration by the coating liquid that forms the functional layer tend to be suppressed.

Examples of the suitably used component A2 include ethylene glycol, 1,2-propanediol, 1,3-propanediol, 1,3-butanediol, 1,4-butanediol, 2-methyl-1,3-propanediol, 3-methyl-1,5-pentanediol, 1,6-hexanediol, 3,3'-dimethylolheptane, 1,4-cyclohexane dimethanol, neopentyl glycol, 3,3-bis(hydroxymethyl)heptane, diethylene glycol, dipropylene glycol, glycerin, trimethylol propane, pentaerythritol, 1,2,4-butanetriol, 1,2,6-hexanetriol, and the like. Among them, as the component A2, at least one selected from 1,2-propanediol and 1,3-butanediol is preferably included.

[(A3) Polyol Compound Having Two or More Hydroxy Groups in Molecule Thereof and Having Number Average Molecular Weight of 400 to 2000]

As the component A3, components having a number average molecular weight of 400 to 2000 in the above-mentioned components A1-2 can be appropriately used. For the component A3, one type may be used singly or two or more types may be used in combination.

[(A4) Amine Compound Having at Least One or More Amino Groups]

As a component A4, monoamine, diamine, and triamine are suitably used. One component A4 may be used singly or two or more components A4 may be used in combination.

Examples of the suitably used A4 component include n-butylamine, sec-butylamine, tert-butylamine, dibutylamine, diisopropylamine, 1,2,2,6,6-pentamethyl-4-aminopiperidine, 2,2,6,6-tetramethyl-4-aminopiperidine, 1,2,2,6,6-pentamethyl-4-aminomethylpiperidine, 1,2,2,6,6-pentamethyl-4-aminobutylpiperidine, isophoronediamine, ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, piperazine, N,N-bis-(2-aminoethyl)piperazine, bis-(4-aminocyclohexyl) methane, bis-(4-amino-3-butylcyclohexyl)methane, 1,2-, 1,3- and 1,4-diaminocyclohexane, norbornanediamine, hydrazine, dihydrazine adipate, phenylenediamine, 4,4'-diphenylmethanediamine, N,N'-diethylethylenediamine, N,N'-dimethylethylenediamine, N,N'-dipropylethylenediamine, N,N'-dibutylethylenediamine, N-methylethylenediamine, N-ethylethylenediamine, bis(hexamethylene)triamine, 1,2,5-pentanetriamine, and the like.

[Use Amounts of Components A1 and A2, and Components A3 and A4 Added as Necessary]

The amount ratio of the above-mentioned components constituting the moisture curable polyurethane (A) may be appropriately determined in consideration of application of use of the moisture curable polyurethane, but the following amount ratio is preferable from the viewpoint of balance the rigidity, heat resistance, adhesion, and the like, of the obtained moisture curable polyurethane.

In other words, when the number of moles of the isocyanate group included in the component A1 is assumed to be $n1$, and the number of moles of the hydroxy group included in the component A2 is assumed to be $n2$, the mole ratio $n1:n2$ is preferably 1:0.15 to 0.70, more preferably 0.25 to 0.65, and further preferably 0.30 to 0.60. Herein, the above $n1$ and $n2$ can be obtained as the product of the number of moles of the compound used as each component and the number of groups present in one molecule of the compound.

Note here that when the component A1 is a component A1-1 as it is, the number of moles of the isocyanate group include in the component A1-1 may be $n1$. Furthermore, when the component A1 is a component A1-1' obtained by reacting the component A1-1 with the component A1-2, the number of moles of the isocyanate groups include in the component A1-1' may be $n1$.

Furthermore, when the number of moles of the hydroxy groups included in the component A3 to be used as necessary is assumed to be $n5$, and the number of moles of the amino groups included in the component A4 is assumed to be $n6$, the amount ratio is as follows preferably. In other words, $n1:n2:(n5+n6)$ is preferably 1:0.15 to 0.70:0.01 to 0.7, $n1:n2:(n5+n6)$ is more preferably 1:0.25 to 0.65:0.01 to 0.4, and $n1:n2:(n5+n6)$ is further preferably 1:0.30 to 0.60:0.01 to 0.25. Herein, the above $n1$, $n2$, $n5$, and $n6$ can be obtained as the product of the number of moles of compounds used as the components and the number of groups present in one molecule of the compound.

[Content of Isocyanate Group Included in Moisture Curable Polyurethane (A)]

The content of isocyanate included in the moisture curable polyurethane (A) is preferably 1.0 to 15.0% by mass, more preferably 2.0 to 10.0% by mass, and further preferably 3.5 to 7.0% by mass from the viewpoint of adhesion to an optical base material, a photochromic resin layer, and the like.

Note here that the isocyanate group content included in the moisture curable polyurethane (A) is determined by the reverse titration method of isocyanate groups

[Number Average Molecular Weight of Moisture Curable Polyurethane (A)]

The number average molecular weight of the moisture curable polyurethane (A) is preferably 500 to 10000, more preferably 1000 to 3000, and further preferably 1000 to 2500 from the viewpoint of improving the intermolecular force between molecular chains of the moisture curable urethane resin. With such a number average molecular weight, when the protective layer is formed using the moisture curable urethane composition according to this embodiment, transfer of the coloring agent from the colored protective film and damages on a surface tend to be more suppressed. Furthermore, when the primer layer is formed using the moisture curable urethane composition according to this embodiment, adhesion between the primer layer and a functional layer laminated on the primer layer is improved, and appearance defects such as dissolution and infiltration by the coating liquid forming the functional layer tend to be suppressed.

Note here that the number average molecular weight of the moisture curable polyurethane (A) is measured by gel permeation chromatography (GPC measurement) under the following conditions. As the apparatus, a liquid chromatograph apparatus (manufactured by Nihon Waters K.K.) is used. As the column, Shodex KD-806M (manufactured by Showa Denko K.K. is used (elimination limit molecule weight: 200000000). Furthermore, as a developing liquid, dimethylformamide (DMF) is used, and measurement is carried out in the conditions at a flow rate of 1 mL/min and a temperature of 40° C. Then, polyethylene glycol is used as a standard sample, and the number average molecular weight is obtained by comparative conversion. As a detecting equipment, a differential refractometer is used. Note here that the moisture curable polyurethane (A) is subjected to measurement after treatment with butylamine is carried out in advance to inactivate the isocyanate group.

[Number of Urethane Bonds Included in Moisture Curable Polyurethane (A)]

The number of urethane bonds included in the moisture curable polyurethane (A) is preferably 0.100 to 0.700 mol/100 g, more preferably 0.200 to 600 mmol/g, and further preferably 0.300 to 0.500 mmol/g from the viewpoint of improving the intermolecular force between molecular chains of the moisture curable urethane resin. With such a number of urethane bonds, when the protective layer is formed using the moisture curable urethane composition according to this embodiment, transfer of the coloring agent from the colored protective film and damages on a surface tend to be more suppressed. Furthermore, when the primer layer is formed using the moisture curable urethane composition according to this embodiment, adhesion between the primer layer and a functional layer laminated on the primer layer is improved, and appearance defects such as dissolution and infiltration by the coating liquid forming the functional layer tend to be suppressed.

Note here that the number of urethane bonds included in the moisture curable polyurethane (A) is determined by calculating the number of urethane bonds included in one molecule from the mole ratio included in one molecule when each component used for production is theoretically reacted, and converting the number into the number of moles included in 100 g of the moisture curable polyurethane. When the moisture curable polyurethane (A) is produced, when a urea bond is introduced into the molecular chain using the component A4, the urea bond is also calculated into the number of urethane bonds.

[Method for Producing Moisture Curable Polyurethane (A)]

A method for producing the moisture curable polyurethane (A) is not particularly limited, well-known methods can be employed. For example, a method for reacting the components A1 and A2, and components A3 and A4 added as necessary in the presence or absence of an organic solvent, preferably, in an inert gas atmosphere such as nitrogen and argon at a reaction temperature of room temperature (23° C.) to 130° C. can be employed. When the reaction temperature is 130° C. or less, decomposition of the reacted product can be suppressed, and a desired moisture curable polyurethane (A) can be obtained. The reaction time changes depending on the charge ratio of each component, but the reaction time may be set to a range of 0.5 hours to 96 hours. Furthermore, an organic solvent and/or a catalyst described in the production method of the component A1-1', as necessary, may be used.

The total content of the component A is preferably 10 to 50% by mass, and more preferably 15 to 35% by mass with respect to the total amount of the moisture curable polyurethane composition according to this embodiment.

<(B) Organic Solvent>

As an organic solvent as a component B, well-known organic solvents can be used without limitation. One type of organic solvent may be used or two or more types of organic solvents may be used in combination.

Among them, solubility of the component A, wettability of a moisture curable polyurethane composition to an optical article such as plastic lens, storage stability of the moisture curable polyurethane composition, and the like, an organic solvent having a solubility parameter of 8 $[(cal/cm^3)^{1/2}]$ or more and not having an active hydrogen is preferable. Examples of such organic solvents include toluene (8.8), ethyl acetate (9.0), xylene (8.8), acetone (10.0), tetrahydrofuran (9.4), dichloromethane (9.7), chloroform (9.3), cyclopentyl methyl ether (8.4), methyl ethyl ketone (9.3), methyl isobutyl ketone (9.6), diethyl ketone (8.7), and the like. Toluene, ethyl acetate, tetrahydrofuran, dichloromethane, chloroform, and diethyl ketone are preferable. Note here that numbers shown in the brackets represent the solubility parameter. The solubility parameter may be also called Hildebrand parameter, an SP value, or the like.

The content of the component B is preferably 100 to 1000 parts by mass, and more preferably 150 to 700 parts by mass with respect to 100 parts by mass of the component A from the viewpoint of reaction efficiency, effect of the remaining organic solvent, and the like.

<(C) Other Components>

The moisture curable polyurethane composition according to this embodiment may contain the below-mentioned photochromic compound (E) or various types of compounding agents, each of which is well-known as it is, as long as the effects of the present invention are not impaired. Examples of the compounding agent include compounds absorbing specific wavelength, such as a UV absorber and an infrared absorber; a UV stabilizer, an antioxidant, a coloring inhibitor, an antistatic agent, a dye, a pigment, and a flavoring agent, a leveling agent, a silane coupling agent, a glycidyl compound, and the like.

The total content of the other components is preferably 0.001 to 20 parts by mass with respect to 100 parts by mass of the component A.

In particular, the moisture curable polyurethane composition according to this embodiment is preferably contains a leveling agent from the viewpoint of improving the smoothness of the polyurethane resin layer. Examples of the leveling agent include surfactants such as a silicone surfactant and a fluorine-containing surfactant. Specific examples of the silicone surfactant and the fluorine-containing surfactant include "L-7001", "L-7002", "L-7604", "FZ-2123", and "FZ2104" manufactured by Dow Corning Toray Co., Ltd.; "MEGAFACE F-470", "MEGAFACE F-1405", and "MEGAFACE F-479" manufactured by DIC CORPORATION; "Florade FC-430" manufactured by 3M Japan LTD.; and the like, can be mentioned. When the surfactant is used, two or more may be mixed for use.

The content of the leveling agent is not particularly limited as long as the effect of the present invention is not impaired, but the content is preferably 0.001 to 1 parts by mass, and more preferably 0.01 to 0.5 parts by mass with respect to 100 parts by mass of the component A.

Furthermore, the moisture curable polyurethane composition according to this embodiment preferably contains silane coupling agent and/or a glycidyl compound from the viewpoint of improving adhesion.

The silane coupling agent is not particularly limited, and well-known compounds can be used. Among them, compounds having an alkoxy group as a hydrolytic group are preferable, compounds having two or more alkoxy groups bonded to a silicon atom are more preferable.

Examples of the preferable silane coupling agent include γ-glycidoxypropyltrimethoxysilane, γ-glycidoxypropylmethyldimethoxysilane, γ-glycidoxypropylmethyldiethoxysilane, γ-glycidoxypropyltriethoxysilane, 5,6-mpoxyhexyltriethoxysilane, β-(3,4-epylcyclohexyl)ethyltrimethoxysilane, tetraethoxysilane, tetramethoxysilane tetramer, tetraethoxysilane pentamer, vinyltrimethoxyci silane, vinyl triethoxysilane, vinyl triacetoxysilane, methyltrimethoxysilane, methyltriethoxysilane, methyltriphenoxysilane, dimethyldimethoxysilane, trimethylmethoxysilane, phenyltrimethoxysilane, diphenyldimethoxysilane, cyclohexylmethyldimethoxysilane, 1,2-bis(trimethoxysilyl)ethane, 1,2-bis(triethoxysilyl)ethane, 1,3-bis(trimethoxysilyl)propane, 1,3-bis(triethoxysilyl)propane, 1,6-bis(trimethoxysilyl)hexane, 1,6-bis(triethoxysilyl)hexane, n-propyltrimethoxysilane, n-butyltrimethoxysilane, isobutyltrimethoxysilane, isobutyltriethoxysilane, n-hexyltrimethoxysilane, n-hexyltriethoxysilane, n-octyltriethoxysilane, n-decyltrimethoxysilane, 3-ureidopropyltriethoxysilane, bis[3-(diethoxymethylsilyl)propyl]carbonate, trifluoropropyltrimethoxysilane, perfluorooctylethyltriethoxysilane, γ-chloropropyltrimethoxysilane, vinyltri(β-methoxy-ethoxy)silane, allyltrimethoxysilane, γ-acryloxypropyltrimethoxysilane, γ-acryloxypropyltriethoxysilane, Γ-methacryloxypropyltrimethoxysilane, γ-methacryloxypropyltriethoxysilane, γ-methacryloxypropyldimethoxymethylsilane, γ-mercaptopropyltrialkoxysilane, γ-aminopropyltrimethoxysilane, γ-aminopropyltriethoxysilane, N-phenyl-γ-aminopropyltrimethoxysilane, N-2(aminoethyl)3-aminopropyltriethoxysilane, N-2(aminoethyl)3-aminopropyltrimethoxysilane, N-2(aminoethyl)3-aminopropylmethyldimethoxysilane, p-styryltrimethoxysilane, 3-isocyanpropyltriethoxysilane, and those in which part or all of the hydrolyzable groups in the organosilicon compound are hydrolyzed or partially condensed, and the like. One type of silane coupling agent may be used singly, or two or more types may be used in combination.

Among them, as silane coupling agents for further improving adhesion, γ-glycidoxypropyltrimethoxysilane, γ-glycidoxypropyltriethoxysilane, γ-glycidoxypropylmethyldimethoxysilane, γ-glycidoxypropylmethyldiethoxysilane, and the like, are suitably used.

The blending amount of the silane coupling agent is not particularly limited as long as long as the effect of the present invention is not impaired, but the content is preferably 0.001 to 20 parts by mass, and more preferably 0.01 to 10 parts by mass with respect to 100 parts by mass of the component A.

The glycidyl compound is not particularly limited, and well-known glycidyl compounds can be used. Examples of the preferable glycidyl compounds include glycidyl methacrylate, and the like.

The content of the glycidyl compound is not particularly limited as long as the effect of the present invention is not impaired, but the content is preferably 0.001 to 20 parts by mass, and more preferably 0.01 to 10 parts by mass with respect to 100 parts by mass of the component A.

Furthermore, the moisture curable polyurethane composition according to this embodiment preferably contains, as a compound that absorbs a specific wavelength, at least one selected from the groups consisting of a compound (C1) having a local maximum absorption wavelength in the range of more than 400 nm and 450 nm or less (hereinafter, also referred to as a "component C1"), a UV absorber (C2) (hereinafter, also referred to as a "component C2"), and a coloring agent (C3) having an absorption peak in the range of 550 nm to 600 nm (hereinafter, also referred to as a "component C3").

The component C1 is not particularly limited and commercially available compounds can be used as long as it is a compound having the local maximum absorption wavelength of more than 400 nm and 450 nm or less. From the viewpoint of dispersibility of the moisture curable polyurethane composition according to this embodiment, the component C1 is preferably a perylene-based compound, a porphyrin compound, a carotenoid-based compound, a cyanine-based compounds, and the like.

Examples of the carotenoid-based compounds include carotenes such as zeta-carotene. Zeta-carotene can be synthesized by a known method.

As the cyanine-based compounds, commercially available compounds can be used. Examples of the commercially available products include cyanine compounds and merocyanine compounds available from Tokyo Chemical Industry Co., Ltd.; FDB-009 (product name) available from Yamada Chemical Co., Ltd., and the like.

Among these components C1, the porphyrin compounds are preferably used. Also, among the porphyrin compounds, porphyrin metal complexes including metals such as copper, magnesium, zinc, cobalt, titanium, tin, iron, lead, vanadium, and the like, as a center metal can be used. Furthermore, as the porphyrin compound, the compounds described in PCT International Publication No. WO2018/230513, etc., can be suitably used.

As the porphyrin metal complex, commercially available products can be used. Examples of the commercially available product include products available from Tokyo Chemical Industry Co., Ltd., and FDB-001, FDB-002 (product name) and the like available from Yamada Chemical Co., Ltd.

The content of the component C1 is not particularly limited, and may be properly determined depending on the purpose of use and the like. Among them, the content is preferably 0.01 to 20 parts by mass, more preferably 0.01 to 10 parts by mass, and further preferably 0.02 to 3 parts by mass with respect to 100 parts by mass of the component A.

As the component C2, commercially available triazine-based compounds, benzotriazole-based compounds, benzophenone-based compounds, and the like can be used. Among them, compounds efficiently absorbing ultraviolet light and blue light having a long wavelength and having high durability are preferable, a UV absorber described in PCT International Publication No. WO2018/230513, etc., having a local maximum absorption wavelength in a range from 320 nm to 400 nm can be suitably used.

The content of the component C2 is not particularly limited, but the content is preferably 0.01 to 20 parts by mass, more preferably 0.1 to 20 parts by mass, and further preferably 0.5 to 20 parts by mass with respect to 100 parts by mass of the component A.

The component C3 is useful from the viewpoint of improving the antiglare property. Examples of the C3 component include nitro-based compounds, azo-based compounds, anthraquinone-based compounds, threne-based compounds, porphyrin-based compounds, rare earth metal compounds, and the like. Among them, porphyrin-based compounds and rare earth metal compounds are preferable from the viewpoint of antiglare property and visibility, and porphyrin-based compounds are more preferable from the viewpoint of dispersion stability in the moisture curable polyurethane composition. Note here that the porphyrin compound of the C3 component is different from the porphyrin compound of the C1 component.

Rare earth metal compounds include complexes such as aquahydroxy(1-phenyl-1,3-butandionato)neodymium, aquahydroxy(phenacylphenylketonato)neodymium, aquahydroxy(1-phenyl-2-methyl-1,3-butandionato)neodymium, aquahydroxy(1-thiophenyl-1,3-butandionato)neodymium, aquahydroxy(1-phenyl-1,3-butandionato)erbium, and aquahydroxy(1-phenyl-1,3-butandionato)holonium.

The porphyrin-based compounds are compounds which may have various substituents in a porphyrin skeleton, and for example, compounds disclosed in Japanese Unexamined Patent Application, Publication No. H5-194616, Japanese Unexamined Patent Application, Publication No. H5-195446, Japanese Unexamined Patent Application, Publication No. 2003-105218, Japanese Unexamined Patent Application, Publication No. 2008-134618, Japanese Unexamined Patent Application, Publication No. 2013-61653, Japanese Unexamined Patent Application, Publication No. 2015-180942, PCT International Publication No. WO2012/020570, Japanese Patent No. 5626081, Japanese Patent No. 5619472, Japanese Patent No. 5778109, and the like.

The content of the component C3 is not particularly limited, and may be appropriately determined depending on the purpose of use and the like. Among them, the content is preferably 0.001 to 10 parts by mass with respect to 100 parts by mass of the component A.

Furthermore, a UV stabilizer is suitably blended in the moisture curable polyurethane composition according to this embodiment because it can enhance the durability of the polyurethane resin layer. Examples of the known UV stabilizers include hindered amine light stabilizer, hindered phenol antioxidant, sulfur-based antioxidant, and the like. Examples of particularly suitable UV stabilizers include bis(1,2,2,6,6-pentamethyl-4-piperidyl)sebacate; ADEKA STAB LA-52, LA-57, LA-62, LA-63, LA-67, LA-77, LA-82, LA-87 manufactured by ADEKA Corporation; 2,6-di-t-butyl-4-methyl-phenol, ethylenebis (oxyethylene)bis[3-(5-t-butyl-4-hydroxy-m-tolyl)propionate]; IRGANOX 1010, 1035, 1075, 1098, 1135, 1141, 1222, 1330, 1425, 1520, 259, 3114, 3790, 5057, 565; and the like, manufactured by BASF, and the like.

The content of the UV stabilizer is not particularly limited, but the content is preferably 0.001 to 10 parts by mass, and more preferably 0.01 to 5 parts by mass with respect to 100 parts by mass of the component A.

In production of the component A, a catalyst such as dibutyltin dilaurate, dimethyl imidazole, triethylenediamine, tetramethyl-1,6-hexadiamine, tetramethyl-1,2-ethanediamine, and 1,4-diazabicyclo[2.2.2]octane, or the like, or a catalyst to promote block isocyanate dissociation, may be additionally added. When a urethane prepolymer obtained by the prepolymer reaction is used, it may be used as it is without removing the catalyst used in the prepolymer reaction. When the catalyst is used, the addition amount of the catalyst is preferably 0.001 to 1 part by mass with respect to 100 parts by mass of the component A.

<Method for Preparing Moisture Curable Polyurethane Composition>

The moisture curable polyurethane composition according to this embodiment can be prepared by a well-known method. For example, a moisture curable polyurethane composition can be obtained by blending and stirring the moisture curable polyurethane (A), organic solvent (B), and other components (C) if necessary. The stirring temperature may be appropriately adjusted in a range of 0° C. to 100° C., and the stirring time may be appropriately adjusted in a range of 0.1 to 48 hours. Note here that since an isocyanate group is present at the end of the moisture curable polyurethane (A), preparation is preferably carried out in an atmosphere of inert gases such as argon and nitrogen in order to suppress contamination of moisture.

«Laminate»

A laminate according to this embodiment includes an optical base material, and polyurethane resin layer formed from the above-described moisture curable polyurethane composition. The laminate according to this embodiment may further include a photochromic resin layer. When the laminate according to this embodiment includes a photochromic resin layer, the order of lamination may be in the order of a photochromic resin layer, a polyurethane resin layer, and an optical base material, or may be in the order of a polyurethane resin layer, a photochromic resin layer, and an optical base material.

<Photochromic Resin Layer>

The photochromic resin layer is not particularly limited as long as it is made of a resin including a photochromic compound. As the resin, a (meth)acrylate resin, a polyurethane resin, a polyurethane urea resin, an epoxy resin, a polycarbonate resin, an allyl resin, and the like, can be used. Among these, a (meth) acrylate resin, a polyurethane resin, and a polyurethane urea resin are preferable from the viewpoint of photochromic property (particularly, a fading speed), and a (meth)acrylate resin is more preferable from the viewpoint of good photochromic property and hardness. Note here that the term "(meth)acrylate" means both "acrylate" and "methacrylate". Also, the same is true to the other terms such as "(meth)acryloyl group".

[(D) (Meth)Acrylate Resin]

A (meth)acrylate resin (D) is not particularly limited, but a resin obtained by polymerizing a polymerizable monomer (D1) represented by the following formula (1) (hereinafter, also referred to as a "component D1"), and a polymerizable monomer (D2) other than the component D1 (hereinafter, also referred to as a "component D2") is preferable from the viewpoint that photochromic properties are good.

((D1) Polymerizable Monomer Represented by the Following Formula (1))

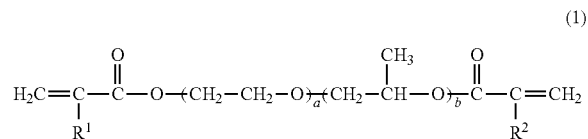

(1)

In the formula, $R^1$ and $R^2$ each independently represent a hydrogen atom or a methyl group; a and b each independently represent an integer of 0 or more, and a+b is an integer of 2 or more. Note here that the polymerizable monomer represented by the above formula (1) is often obtained in a mixture in production. Therefore, a+b is a numeric value of 2 or more as an average value, and preferably a numeric value of 2 to 50 as an average value.

Specific examples of the polymerizable monomer represented by above formula (1) include, for example, diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, a dimethacrylate composed of a mixture of polypropylene glycol and polyethylene glycol (polyethylene has two recurring units, and polypropylene has two recurring units), polyethylene glycol dimethacrylate (in particular, a=4, b=0, average molecular weight: 330), polyethylene glycol dimethacrylate (in particular, a=9, b=0, average molecular weight: 536), polyethylene glycol dimethacrylate (in particular, a=14, b=0, average molecular weight: 736), tripropylene glycol dimethacrylate, tetrapropylene glycol dimethacrylate, polypropylene glycol dimethacrylate (in particular, a=0, b=7, average molecular weight: 536), polyethylene glycol diacrylate (in particular, average molecular weight: 258), polyethylene glycol diacrylate (in particular, a=4, b=0, average molecular weight: 308), polyethylene glycol diacrylate (in particular, a=9, b=0, average molecular weight: 508), polyethylene glycol diacrylate (in particular, a=14, b=0, average molecular weight: 708), and polyethylene glycol methacrylate acrylate (in particular, a=9, b=0, average molecular weight: 522).

((D2) Polymerizable Monomer Other than Component D1)

The component D2 is not particularly limited as long as it is a polymerizable monomer capable of polymerizing with the component D1, and well-known components can be used. Among them, components having polyfunctional (meth)acrylate having two or more (meth)acryloyl groups in a molecule thereof are preferable, and bifunctional (meth)acrylate (D2-1) having two (meth)acryloyl groups in a molecule thereof (hereinafter, also referred to as "D2-1"), and polyfunctional (meth)acrylate (D2-2) having three (meth)acryloyl groups in a molecule thereof (hereinafter, also referred to as "D2-2") are more preferable. Furthermore, monofunctional (meth)acrylate (D2-3) having one (meth)acryloyl group in a molecule (hereinafter, also referred to as "D2-3") can be included.

((D2-1) Bifunctional (meth)acrylate)

The component D2 preferably includes bifunctional (meth)acrylate (D2-1), in particular, bifunctional (meth)acrylate represented by the following formula (2) or (3), bifunctional (meth)acrylate having a urethane bond, and bifunctional (meth)acrylate that does not correspond to the above are suitably used.

((D2-1-1) Bifunctional (meth)acrylate Represented by the Following Formula (2))

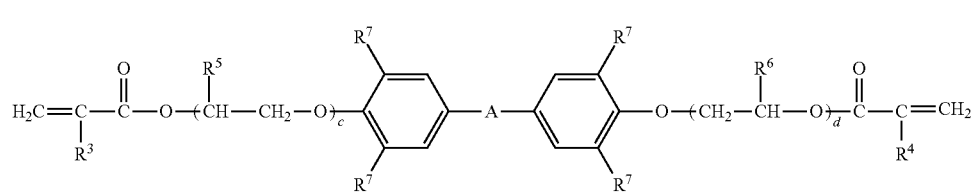

(2)

In the formula, $R^3$ and $R^4$ each independently represent a hydrogen atom or a methyl group; $R^5$ and $R^6$ each independently represent a hydrogen atom or a methyl group; $R^7$ represents a hydrogen atom or a halogen atom; A represents —O—, —S—, —(SO$_2$)—, —CO—, —CH$_2$—, —CH=CH—, —C(CH$_3$)$_2$—, or —C(CH$_3$)(C$_6$H$_5$)—. c and d each independently represent an integer of 1 or more, and c+d is a numeric value of 2 to 30 as an average value. Note here that bifunctional (meth)acrylate represented by the above formula (2) is usually obtained in a form of a mixture of molecules having different molecular weights. Therefore, the c+d is shown by an average value.

Specific examples of the bifunctional (meth)acrylate represented by above formula (2) include, for example, 2,2-bis[4-methacryloyloxyethoxy)phenyl]propane (c+d=2, average molecular weight: 452), 2,2-bis[4-methacryloyloxydiethoxy)phenyl]propane (c+d=4, average molecular weight: 540), 2,2-bis[4-methacryloyloxypolyethoxy)phenyl]propane (c+d=7, average molecular weight: 672), 2,2-bis[3,5-dibromo-4-methacryloyloxyethoxy)phenyl]propane (c+d=2, average molecular weight: 768), 2,2-bis(4-methacryloyloxydipropoxy)phenyl)propane (c+d=4, average molecular weight: 596), 2,2-bis[4-acryloyloxydiethoxy)phenyl]propane (c+d=4 average molecular weight: 512), 2,2-bis[4-(acryloyloxypolyethoxy)phenyl]propane (c+d=3, average molecular weight: 466), 2,2-bis[4-(acryloyloxypolyethoxy)phenyl]propane (c+d=7, average molecular weight: 642), 2,2-bis[4-methacryloyloxy(polyethoxy)phenyl]propane (c+d=10, average molecular weight: 804), 2,2-bis[4-methacryloyloxy(polyethoxy)phenyl]propane (c+d=17, average molecular weight: 1116), 2,2-bis[4-(methacryloyloxypolyethoxy)phenyl]propane (c+d=30, average molecular weight: 1684), 2,2-bis[4-(acryloyloxypolyethoxy)phenyl]propane (c+d=10, average molecular weight: 776), and 2,2-bis[4-(acryloyloxypolyethoxy)phenyl]propane (c+d=20, average molecular weight: 1216), and the like.

((D2-1-2) Bifunctional (Meth)Acrylate Represented by the Following Formula (3))

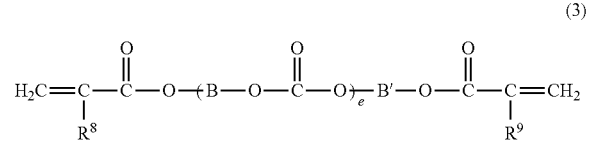

(3)

In the formula, $R^8$ and $R^9$ each independently represent a hydrogen atom or a methyl group; e represents a numeric value of 1 to 20 as an average value; B and B' each independently represent a linear or branched alkylene group having 2 to 15 carbon atoms. When a plurality of Bs is present, the plurality of Bs may be the same as or different from each other.

Bifunctional (meth)acrylate represented by the above formula (3) can be produced by reacting a polycarbonate diol with (meth)acrylic acid.

Specific examples of the polycarbonate diol include, for example, polycarbonate diols (average molecular weight: 500 to 2000) obtained through phosgenation of trimethylene glycol, polycarbonate diols (average molecular weight: 500 to 2000) obtained through phosgenation of tetramethylene glycol, polycarbonate diols (average molecular weight: 500 to 2000) obtained through phosgenation of pentamethylene glycol, polycarbonate diols (average molecular weight: 500 to 2000) obtained through phosgenation of hexamethylene glycol, polycarbonate diols (average molecular weight: 500 to 2000) obtained through phosgenation of octamethylene glycol, polycarbonate diols (average molecular weight: 500 to 2000) obtained through phosgenation of nonamethylene glycol, polycarbonate diols (average molecular weight: 500 to 2000) obtained through phosgenation of triethylene glycol and tetramethylene glycol, polycarbonate diols (average molecular weight: 500 to 2000) obtained through phosgenation of tetramethylene glycol and hexamethylene diglycol, polycarbonate diols (average molecular weight: 500 to 2000) obtained through phosgenation of pentamethylene glycol and hexamethylene glycol, polycarbonate diols (average molecular weight: 500 to 2000) obtained through phosgenation of tetramethylene glycol and octamethylene glycol, polycarbonate diols (average molecular weight: 500 to 2000) obtained through phosgenation of hexamethylene glycol and octamethylene glycol, polycarbonate diols (average molecular weight: 500 to 2000) obtained through phosgenation of 1-methyl trimethylene glycol, and the like.

((D2-1-3) Bifunctional (Meth)Acrylate Having Urethane Bond)

As the bifunctional (meth)acrylate having a urethane bond, one obtained by reacting a polyisocyanate compound (A1-1) having two or more isocyanate groups in a molecule thereof as described above, a polyol compound (A1-2) having two or more hydroxy groups in a molecule thereof, and (meth)acrylate containing a hydroxy group is suitable.

Specific examples of the polyisocyanate compound having two or more isocyanate groups in a molecule thereof include, for example, hexamethylene diisocyanate, isophorone diisocyanate, lysine isocyanate, 2,2,4-hexamethylene diisocyanate, dimeric acid diisocyanate, isopropylidenebis-4-cyclohexyl isocyanate, dicyclohexyl methane diisocyanate, norbornene methane diisocyanate, and methyl cyclohexane diisocyanate.

Specific examples of the polyol compound having two or more hydroxy groups in a molecule thereof include, for example, polyalkylene glycols having the recurring unit of ethylene oxide, propylene oxide, or hexamethylene oxide; polyester diols such as polycaprolactone diol; polycarbonate diols, polybutadiene diols, pentaerythritol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, 1,4-cyclohexane dimethanol, glycerine, trimethylol propane; and the like.

Furthermore, as the bifunctional (meth)acrylate having a urethane bond, it is possible to use a urethane (meth)acrylate which are a reaction mixture obtained by reacting a urethane prepolymer obtained through a reaction of the polyisocyanate compound and the polyol and having an isocyanate group at the end of the molecule with 2-hydroxy(meth)acrylate, and a reaction mixture obtained by directly reacting the above component A1-1 with 2-hydroxy(meth)acrylate, and the like.

Specific examples of the hydroxy group-containing (meth)acrylate include 2-hydroxyethyl(meth)acrylate, 2-hydroxypropyl(meth)acrylate, 3-hydroxypropyl(meth)acrylate, 3-hydroxybutyl(meth)acrylate, 4-hydroxybutyl(meth)acrylate, and the like.

As the bifunctional (meth)acrylate having a urethane bond, commercially available products can be used. Examples of the commercially available products include, for example, U-2PPA (molecular weight: 482), UA-122P (molecular weight: 1100), and U-122P (molecular weight: 1100) manufactured by SHIN-NAKAMURA CHEMICAL Co., Ltd., and EB4858 (molecular weight: 454) manufactured by DAICEL-ALLNEX LTD., and the like.

((D2-1-4) Bifunctional (meth)acrylate not Applicable to the Above)

Examples of the bifunctional (meth)acrylate not applicable to the above (D2-1-4) include a compound having a (meth)acrylate group on both ends of the alkylene group which may have a substituent. Among them, those having an alkylene group having 6 to 20 carbon atoms are preferable. Specific examples include 1,6-hexanediol diacrylate, 1,6-hexanediol dimethacrylate, 1,9-nonanediol diacrylate, 1,9-nonanediol dimethacrylate, 1,10-decanediol diacrylate, 1,10-decanediol dimethacrylate, and the like.

Furthermore, examples of the bifunctional (meth)acrylate not applicable to the above include a bifunctional (meth) acrylate containing a sulfur atom. The sulfur atom preferably forms a part of a molecular chain as a sulfide group. Specific examples thereof include bis(2-methacryloyloxyethylthioethyl)sulfide, bis(methacryloyloxyethyl)sulfide, bis(acryloyloxyethyl)sulfide, 1,2-bis(methacryloyloxyethylthio)ethane, 1,2-bis(acryloyloxyethyl)ethane, bis(2-methacryloyloxyethylthioethyl)sulfide, bis(2-acryloyloxyethylthioethyl)sulfide, 1,2-bis(methacryloyloxyethylthioethylthio)ethane, 1,2-bis(acryloyloxyethylthioethylthio)ethane, 1,2-bis(methacryloyloxyisopropylthioisopropyl)sulfide, 1,2-bis(acryloyloxyisopropylthioisopropyl)sulfide, and the like.

As for each of the above components D2-1, one type may be used singly or two or more types may be used in combination for each component described individually. In addition, each component described individually may be used in combination.

When a plurality of types of components D2-1 are used in combination, the mass of the component B2-1 as a basis is the total amount of the total components.

((D2-2) Polyfunctional (meth)acrylate)

As the component D2-2, polyfunctional (meth)acrylate represented by the following formula (4), polyfunctional (meth)acrylate having a urethane bond, polyrotaxane having a (meth)acryloyl group, and polyfunctional (meth)acrylate not applicable to the above are suitably used.

((D2-2-1) Polyfunctional (meth)acrylate Represented by the Following Formula (4))

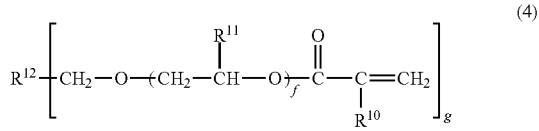

In the formula, $R^{10}$ represents a hydrogen atom or a methyl group, $R^{11}$ represents a hydrogen atom or an alkyl group having 1 to 2 carbon atoms, $R^{12}$ represents a trivalent to hexavalent organic group having 1 to 10 carbon atoms, f represents a number of 0 to 3 in terms of an average value, and g represents an integer of 3 to 6. As the alkyl group having 1 to 2 carbon atoms represented by $R^{11}$, a methyl group is preferable. Examples of the organic group represented by $R^{12}$ include a group derived from a polyol, a trivalent to hexavalent hydrocarbon group, and a trivalent to hexavalent organic group having a urethane bond.

Specific examples of the polyfunctional (meth)acrylate represented by the above formula (4) include, for example, trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate, ditrimethylolpropane tetraacrylate, and the like.

((D2-2-2) Polyfunctional (meth)acrylate Having a Urethane Bond)

Polyfunctional (meth)acrylate having a urethane bond (D2-2-2) is obtained by reacting the above-described component A1-1, the component A1-2 and/or the component A2 with each other, and further reacting a hydroxy group-containing (meth)acrylate therewith, and is suitably those having three or more (meth)acryloyl groups within a molecule.

As the polyfunctional (meth)acrylate having a urethane bond, commercially available products can be used. Examples of the commercially available products include U-4HA (molecular weight: 596, the number of functional groups: 4), U-6HA (molecular weight: 1019, the number of functional groups: 6), U-6LPA (molecular weight: 818, the number of functional groups: 6), U-15HA (molecular weight: 2300, the number of functional groups: 15), manufactured by SHIN-NAKAMURA CHEMICAL Co., Ltd., and the like.

((D2-2-3) Polyrotaxane Having (meth)acryloyl Group)

The polyrotaxane (D2-2-3) having a (meth)acryloyl group has a complex molecular structure including an axis molecule and a plurality of cyclic molecules including the axis molecule, wherein in the polyrotaxane, a side chain having a hydroxy group is introduced in the cyclic molecule, and 1 mol % or more and less than 100 mol % of hydroxy groups of the side chain is modified by a compound having a (meth)acryloyl group. Note here that in the present specification, a reaction in which a hydroxy group in a side chain is reacted with another compound to introduce a structure derived from the other compound is also referred to as "modification".

The polyrotaxane having a (meth)acryloyl group can be produced according to the well-known method described in PCT International Publication No. WO2018/030275.

((D2-2-4) Polyfunctional (meth)acrylate not Applicable to the Above)

Examples of the polyfunctional (meth)acrylate not applicable to the above (D2-2-4) include, for example, a compound in which the end of the polyester compound is modified by a (meth)acryloyl group. Various commercially available polyester (meth)acrylate compounds which vary with the molecular weight of a polyester compound as a raw material and the modification amount of the (meth)acrylic group can be used. Specific examples of the polyester (meth)acrylate compounds include, for example, tetrafunctional polyester oligomers (molecular weight: 2500 to 3500, EB80, manufactured by DAICEL-ALLNEX LTD., etc.), hexafunctional polyester oligomers (molecular weight: 6000 to 8000, EB450 manufactured by DAICEL-ALLNEX LTD., etc.), hexafunctional polyester oligomers (molecular weight: 45000 to 55000, EB1830 manufactured by DAICEL-ALLNEX LTD., etc.), and tetrafunctional polyester oligomers (molecular weight: 10000, GX8488B manufactured by DKS Co. Ltd., etc.).

Use of the above exemplified component D2-2 makes it possible to maintain the photochromic properties and improve the crosslinking density by polymerization as necessary.

As for each of the components D2-2 described above individually, one type may be used singly or two or more types may be used in combination. Furthermore, components described individually may be used in combination. When a plurality of components D2-1 is used in combination, the reference mass of the component D2-2 is the total amount of these components.

((D2-3) Monofunctional (meth)acrylate)

Examples of the monofunctional (meth)acrylate (D2-3) include the monofunctional (meth)acrylate represented by the following formula (5).

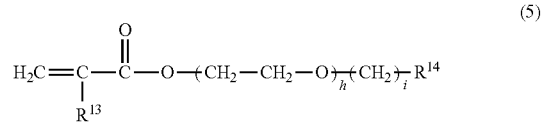

In the formula, $R^{13}$ represents a hydrogen atom or a methyl group, $R^{14}$ represents a hydrogen atom, a methyl dimethoxy silyl group, trimethoxy silyl group, or a glycidyl group, h represents an integer of 0 to 10, and i represents an integer of 0 to 20.

Specific examples of the monofunctional (meth)acrylate represented by the above formula (5) include, for example, methoxy polyethylene glycol methacrylate (in particular, average molecular weight: 293), methoxy polyethylene glycol methacrylate (in particular, average molecular weight: 468), methoxy polyethylene glycol acrylate (in particular, average molecular weight: 218), methoxy polyethylene glycol acrylate (in particular, average molecular weight: 454), stearyl methacrylate, lauryl methacrylate, methyl acrylate, ethyl acrylate, butyl acrylate, octyl acrylate, lauryl acrylate, γ-methacryloyloxypropyl trimethoxysilane, γ-methacryloyloxypropylmethyl dimethoxysilane, glycidyl methacrylate, and the like.

[(E) Photochromic Compound]

As the photochromic compound (E) (hereinafter, also referred to as "component E"), for example, a fulgide compound, a chromene compound, a spirooxazine compound, and the like, are known. In this embodiment, these photochromic compounds can be used without limitation. These may be used singly, or two or more types of these may be used in combination. The fulgide compound, the chromene compound, and the spirooxazine compound are compounds described in, for example, Japanese Unexamined Patent Application, Publication No. H2-28154, Japanese Unexamined Patent Application, Publication No. S62-288830, PCT International Publication No. WO94/22850, PCT International Publication No. WO96/14596, etc.

Compounds which indicate excellent photochromic properties and which are newly found by the present inventors, for example, compounds disclosed in Patent Documents below can be preferably used: Japanese Unexamined Patent Application, Publication No. 2001-114775, Japanese Unexamined Patent Application, Publication No. 2001-031670, Japanese Unexamined Patent Application, Publication No. 2001-011067, Japanese Unexamined Patent Application, Publication No. 2001-011066, Japanese Unexamined Patent Application, Publication No. 2000-347346, Japanese Unexamined Patent Application, Publication No. 2000-344762, Japanese Unexamined Patent Application, Publication No. 2000-344761, Japanese Unexamined Patent Application, Publication No. 2000-327676, Japanese Unexamined Patent Application, Publication No. 2000-327675, Japanese Unexamined Patent Application, Publication No. 2000-256347, Japanese Unexamined Patent Application, Publication No. 2000-229976, Japanese Unexamined Patent Application, Publication No. 2000-229975, Japanese Unexamined Patent Application, Publication No. 2000-229974, Japanese Unexamined Patent Application, Publication No. 2000-229973, Japanese Unexamined Patent Application, Publication No. 2000-229972, Japanese Unexamined Patent Application, Publication No. 2000-219687, Japanese Unexamined Patent Application, Publication No. 2000-219686, Japanese Unexamined Patent Application, Publication No. 2000-219685, Japanese Unexamined Patent Application, Publication No. H11-322739, Japanese Unexamined Patent Application, Publication No. H11-286484, Japanese Unexamined Patent Application, Publication No. H11-279171, Japanese Unexamined Patent Application, Publication No. H10-298176, Japanese Unexamined Patent Application, Publication No. H09-218301, Japanese Unexamined Patent Application, Publication No. H09-124645, Japanese Unexamined Patent Application, Publication No. H08-295690, Japanese Unexamined Patent Application, Publication No. H08-176139, Japanese Unexamined Patent Application, Publication No. H08-157467, Specification of U.S. Pat. No. 5,645,767, Specification of U.S. Pat. No. 5,658,501, Specification of U.S. Pat. No. 5,961,892, Specification of U.S. Pat. No. 6,296,785, Japanese Patent No. 4424981, Japanese Patent No. 4424962, PCT International Publication No. WO2009/136668, PCT International Publication No. WO2008/023828, Japanese Patent No. 4369754, Japanese Patent No. 4301621, Japanese Patent No. 4256985, PCT International Publication No. WO2007/086532, Japanese Unexamined Patent Application, Publication No. 2009-120536, Japanese Unexamined Patent Application, Publication No. 2009-67754, Japanese Unexamined Patent Application, Publication No. 2009-67680, Japanese Unexamined Patent Application, Publication No. 2009-57300, Japanese Patent No. 4195615, Japanese Patent No. 4158881, Japanese Patent No. 4157245, Japanese Patent No. 4157239, Japanese Patent No. 4157227, Japanese Patent No. 4118458, Japanese Unexamined Patent Application, Publication No. 2008-74832, Japanese Patent No. 3982770, Japanese Patent No. 3801386, PCT International Publication No. WO2005/028465, PCT International Publication No. WO2003/042203, Japanese Unexamined Patent Application, Publication No. 2005-289812, Japanese Unexamined Patent Application, Publication No. 2005-289870, Japanese Unexamined Patent Application, Publication No. 2005-112772, Japanese Patent No. 3522189, PCT International Publication No. WO2002/090342, Japanese Patent No. 3471073, Japanese Unexamined Patent Application, Publication No. 2003-277381, PCT International Publication No. WO2001/060811, PCT International Publication No. WO2000/071544, PCT International Publication No. WO2005/028465, PCT International Publication No. WO2011/16582, PCT International Publication No. WO2011/034202, PCT International Publication No. WO2012/121414, PCT International Publication No. WO2013/042800, Japanese Patent No. 6031035, Japanese Patent Application No. 2019-120178, Japanese Patent Application No. 2019-190604, Japanese Patent Application No. 2020-025057, Japanese Patent Application No. 2020-031674, Japanese Patent Application No. 2020-033969, and the like.

Among these components E, in terms of photochromic properties such as a color optical density, initial coloring, durability, and a fading speed, one or more types of chromene compounds having an indeno[2,1-f]naphtho[1,2-b]pyran skeleton are more preferably used. In addition, among these chromene compounds, compounds having a molecular weight of 540 or more are preferable because they are particularly excellent in the color optical density and the fading speed.

As the component E, from among compounds which have groups of long chains having a molecular weight of 300 or more, in particular, substituents of molecular chains such as a polysiloxane chain, a polyoxyalkylene chain, a polyester chain, and a polyester polyether chain, an arbitrary compound can be selected as necessary so as to be used. Since a molecular chain having a molecular weight of 300 or more has a high molecular weight, when the photochromic compound is manufactured, it is likely that not one type of molecular chain but a plurality of types of molecular chains are included. In such a case, as the molecular weight of the molecular chain described above, the average value (number average molecular weight) of a plurality of types may fall within the specified range described above. This molecular weight can be confirmed with the type of raw material when the photochromic compound is manufactured or can be confirmed from a product by a known means such as NMR, IR, or mass analysis.

It is considered that the photochromic compound has a molecular chain having a molecular weight of 300 or more, and that thus even in the photochromic resin layer, higher photochromic properties can be achieved. With consideration given to the photochromic properties, the amount of photochromic compound mixed and the productivity of the photochromic compound itself, the molecular weight of the molecular chain described above is preferably 300 to 25000, more preferably 400 to 20000, further preferably 440 to 15000, and particularly preferably 500 to 10000.

When the photochromic compound has a molecular chain having a molecular weight of 300 or more, the number of molecular chains described above is preferably 0.5 or more with respect to one molecule of the photochromic compound. In other words, even when the number of molecular chains described above is the lowest, a structure in which two photochromic compounds are bonded together with the molecular chain is preferably provided. With consideration given to a good balance with the molecular weight of the molecular chain, the photochromic properties and the like, the upper limit of the number of molecular chains described above is preferably four or less, more preferably two or less, and further preferably one.

Furthermore, the component E is preferable in which in the molecular structure that achieves the photochromic properties, part of the molecule is cleaved by the light irradiation so as to produce color, and in which the cleaved part is rejoined so as to degrade the color. Hence, in order for the photochromic compound to reversibly repeat color production and color degradation, the existence of a free space in which the movement of the molecule is not prevented when cleaving and rejoining occur (flexibility of the molecule) is important. It is considered that in the case of the compound having the molecular structure as described above, in particular, the effect of the molecular chain described above is achieved.

Examples of such photochromic compounds include, for example, compounds disclosed in PCT International Publication No. WO2000/015630, PCT International Publication No. WO2004/041961, PCT International Publication No. WO2005/105874, PCT International Publication No. WO2005/105875, PCT International Publication No. WO2006/022825, PCT International Publication No. WO2009/146509, PCT International Publication No. WO2010/20770, PCT International Publication No. WO2012/121414, PCT International Publication No. WO2012/149599, PCT International Publication No. WO2012/162725, PCT International Publication No. WO2012/176918, PCT International Publication No. WO2013/078086, PCT International Publication No. WO2019/013249, PCT International Publication No. WO2019/203205, PCT International Publication No. WO2020/017610, PCT International Publication WO2019/203205, Japanese Unexamined Patent Application, Publication No. 2019-182866, and the like.

The content of the component E is preferably 0.01 to 20 parts by mass, more preferably 0.1 to 15 parts by mass, and further preferably 0.5 to 10 parts by mass with respect to 100 parts by mass of the photochromic resin layer 100 parts by mass.

[Blending Ratio of Each Component in Photochromic Resin Layer]

In the blending ratio of the component D1 and the component D2 described above, considering the photochromic properties such as the color optical density of the obtained photochromic resin layer and the fading speed, it is preferable that the component D1 is 40 to 95 parts by mass and the component D2 is 5 to 60 parts by mass when the total amount of the component D1 and the component D2 is 100 parts by mass.

Furthermore, the component D2 includes a component D2-2, and preferably include a component D2-1 and a component D2-3 as necessary. More specifically, it is preferable that the component D2-1 is 0 to 30 parts by mass, the component D2-2 is 50 to 100 parts by mass, and the component D2-3 is 0 to 50 parts by mass when the total amount of the component D2 is 100 parts by mass.

The blending ratio of the photochromic compound, is preferably 0.1 to 10 parts by mass, and more preferably 2 to 10 parts by mass when the total amount of the component D1 and the component D2 is 100 parts by mass, considering the photochromic properties such as the color optical density of the obtained photochromic resin layer and the fading speed.

[Other Components]

The photochromic resin layer may contain a polymerization initiator such as a thermal polymerization initiator and a photopolymerization initiator.

Examples of the thermal polymerization initiator include a diacyl peroxide such as benzoyl peroxide, p-chlorobenzoyl peroxide, decanoyl peroxide, lauroyl peroxide, and acetyl peroxide; a peroxy ester such as t-butylperoxy-2-ethyl hexanoate, t-butylperoxy neodecanoate, cumylperoxy neodecanoate, and t-butylperoxy benzoate; percarbonate such as diisopropylperoxy dicarbonate and di-sec-butylperoxy dicarbonate; an azo compound such as azobisisobutyronitrile; and the like.

Examples of the photopolymerization initiator include an acetophenone-based compound such as 1-phenyl-2-hydroxy-2-methylpropan-1-one, 1-hydroxycyclohexyl phenyl ketone, and 1-(4-isopropylphenyl)-2-hydroxy-2-methylpropan-1-one; an α-dicarbonyl-based compound such as 1,2-diphenylethanedione and methylphenyl glycoxylate; an acylphosphine oxide-based compound such as 2,6-dimethylbenzoyl diphenylphosphine oxide, 2,4,6-trimethylbenzoyl diphenylphosphine oxide, 2,4,6-trimethylbenzoyl diphenylphosphinic acid methyl ester, 2,6-dichlorobenzoyl diphenylphosphine oxide, 2,6-dimethoxybenzoyl diphenylphosphine oxide, and phenylbis(2,4,6-trimethylbenzoyl) phosphine oxide, and the like.

Note here that when a photopolymerization initiator is used, a known polymerization-curing acceleration aid such as a tertiary amine can also be used in combination.

Various types of additives being known themselves, in addition to the above-described components, can be blended in the photochromic resin layer described above as long as the effects of the present invention are not impaired. Examples of the additives include, for example, a UV absorber, an infrared absorber, a UV stabilizer, an antioxidant, an anti-coloring agent, an antistatic agent, a dye, a pigment, fragrance, a solvent, a leveling agent, and the like.

Among them, it is preferable that a UV stabilizer is used because durability of the photochromic compound can be improved. As the UV stabilizer, a hindered amine photostabilizer, a hindered phenol antioxidant, and a sulfur-based antioxidant are known. Examples of particularly suitable UV stabilizer include bis(1,2,2,6,6-pentamethyl-4-piperidyl)sebacate; ADEKA STAB LA-52, LA-57, LA-62, LA-63, LA-67, LA-77, LA-82, and LA-87, which are manufactured by Adeka Corporation; 2,6-di-tert-butyl-4-methylphenol, ethylenebis(oxyethylene) bis[3-(5-tert-butyl-4-hydroxy-m-tolyl)propionate]; and IRGANOX 1010, 1035, 1075, 1098, 1135, 1141, 1222, 1330, 1425, 1520, 259, 3114, 3790, 5057, 565, and 254, which are manufactured by BASF.

The blending amount of the UV stabilizer is not particularly limited as long as the effect of the present invention is not impaired, but usually is 0.001 to 10 parts by mass, and preferably 0.01 to 3 parts by mass with respect to the total amount 100 parts by mass of the components D1 and D2. In particular, in the case where a hindered amine photostabilizer is used, the stabilizer is used in an amount of preferably 0.5 to 30 mol, more preferably 1 to 20 mol, and still more preferably 2 to 15 mol per mol of the photochromic compound in order to prevent the color drift of adjusted developed color tone as a result that the effect of improving durability differs depending on the type of the photochromic compound.

<Optical Base Material>

Examples of the optical base material include a plastic lens base material. Examples of the plastic lens base material include, for example, thermoplastic resin lenses such as (meth)acrylic resin and polycarbonate resin; and crosslinkable resin lenses such as polyfunctional (meth)acrylic resin, allyl resin, thiourethane resin, urethane resin, and thioepoxy resin; and the like. Applicable examples include a plastic lens base material in which a hard coat layer or the like is laminated on these plastic lens base materials.

In order to improve adhesion with respect to a photochromic resin layer and the like, the optical base material may be subjected to a chemical treatment with an alkaline solution, an acidic solution, or the like; a physical treatment by corona discharge, plasma discharge, polishing, or the like in advance.

Furthermore, when the moisture curable polyurethane composition described above is laminated on the photochromic resin layer of an optical article and used as a protective layer, another layer may be laminated between the optical base material and the photochromic resin layer or between the photochromic resin layer and the protective layer formed from the moisture curable polyurethane composition. For example, before forming the photochromic resin layer on the surface of the optical base material, it is also possible to provide a primer layer such as polyurethane-based, polyester-based, polyvinyl acetal-based, or epoxy-based layer on the surface of the optical base material. Of course, the moisture curable polyurethane composition described above can also be used to form the primer layer.

As the primer layer, well-known polyurethane resin can be used. Among them, from the viewpoint of the adhesion, the moisture curable polyurethane resin or the precursor thereof described in Japanese Patent No. 4405833, or a primer layer including a water dispersion urethane emulsion described in Japanese Patent No. 5016266 or Japanese Patent No. 5084727 are preferable.

<Method of Forming Photochromic Resin Layer on Optical Base Material>

It is preferable that the photochromic resin layer (D) is formed as follows, for example, each of the above-mentioned monomer components, the photochromic compound, and other components as necessary are mixed to prepare a photochromic monomer composition, and the resulting mixture is then polymerized on an optical base material.

Polymerization for preparing the photochromic resin layer is carried out by irradiation with an active energy rays (ultraviolet light, α-rays, β-rays, γ-rays, LED light, or the like), heating, or both the irradiation and the heating. In other words, appropriate polymerization means may be employed depending on types of polymerizable monomers and polymerization curing accelerators, and the form of photochromic resin layers to be formed. When the photochromic resin layer is formed by the below-mentioned coating method, from the viewpoint that uniform film thickness is obtained, optical polymerization is preferably employed.

When the photochromic monomeric composition is photo-polymerized, among polymerization conditions, in particular, illuminance condition affects the properties of the obtained photochromic resin layer. This illuminance condition is affected by the type and amount of the photopolymerization initiator and the types of the photopolymerization monomers, and therefore, it cannot be unequivocally limited. However, in general, it is preferable to choose the condition such that a UV light of 10 to 500 mW/cm$^2$ at a wavelength of 365 nm is irradiated for 0.1 to 5 minutes.

When the photochromic resin layer is formed by the above-described coating method, a photochromic monomeric composition is used as a coating liquid, the coating liquid is applied onto the surface of an optical base material, such as a lens substrate through spin coating, dipping, or the like, and subsequently, polymerization is carried out through UV irradiation, heating, or the like, in an inert gas such as nitrogen, thereby forming a photochromic resin layer on the surface of the optical base material.

When the photochromic resin layer is formed on the surface of the optical base material by the above-described coating method, adhesion between the photochromic resin layer and the optical base material can be enhanced by subjecting the surface of the optical base material to a chemical treatment with an alkaline solution, an acidic solution, or the like; a physical treatment by corona discharge, plasma discharge, polishing, or the like, in advance. Of course, an additional transparent adhesive resin layer can also be provided on the surface of the optical base material.

The above-described photochromic resin layer can exhibit excellent photochromic properties in terms of the color optical density and, in particular, the fading speed, and the like, and be used effectively in production of an optical base material provided with the photochromic properties, for example, production of photochromic lens. Note here that the coating method is described as the method for forming a photochromic resin layer, a photochromic resin layer may be formed using other methods such as cast polymerization.

<Method for Forming Polyurethane Resin Layer on Optical Base Material and/or Photochromic Resin Layer>

The method for forming a polyurethane resin layer using a moisture curable polyurethane composition is not particularly limited, but it is preferable that, for example, a moisture curable polyurethane composition containing a moisture curable polyurethane (A) and an organic solvent (B) is prepared, and provided on the optical base material and/or the photochromic resin layer formed on the optical base material, and cured by drying in the presence of moisture (i.e., moisture in the air) to form a polyurethane resin layer. It is possible to additionally carry out heating as necessary.

The method for providing a moisture curable polyurethane composition on the optical base material and/or the photochromic resin layer is not particularly limited, and a method such as a dip coating, a spin coating, a dip spin coating, a dip and spin coating, a flow coating, and the like, may be employed. Among them, from the viewpoint of reacting moisture (i.e., moisture in the air), the spin coating is preferable.

Furthermore, the curing may be carried out by only applying the moisture curable polyurethane composition, and then drying in the presence of moisture (i.e., moisture in the air), but heat treatment and/or heating and humidification treatment may be carried out in order to accelerate the drying in a range in which the heat resistance of an optical base material or a resin are not affected.

Specifically, the temperature for accelerating the drying is preferably in the range of room temperature (23° C.) to 130° C. Furthermore, the humidity for accelerating the drying is preferably in the range of 45% RH to 95% RH. Within this range, deformation and discoloration of the optical base material due to heating can be suppressed. The heating time is not particularly limited, but is usually in the range of 1 minute to 6 hours, and the heating/humidifying time is not particularly limited, but is usually in the range of 5 minutes to 48 hours.

A thickness of the moisture curable polyurethane resin layer is not particularly limited, but the thickness is preferably 0.1 to 10 μm, more preferably 0.1 to 8 μm, and further preferably 0.5 to 5 μm when the appearance of an ultraviolet lens, adhesion, rigidity, and smoothness of the formed moisture curable polyurethane resin layer are taken into consideration.

Furthermore, according to use purpose, it is possible to subject the laminate according to this embodiment to a post-treatment such as dying with a dye, such as a dispersion dye; fabrication of a hard coat film by using a silane coupling agent or a hard coating agent mainly composed of a sol of silicon, zirconium, antimony, aluminum, tin, or tungsten; formation of a thin film through vapor deposition of a metal oxide such as $SiO_2$, $TiO_2$, and $ZrO_2$; antireflection treatment with a thin film formed by applying an organic polymer, antistatic treatment, mirror coating treatment, water repellent treatment, hydrophilization treatment, anti-fog treatment, anti-fouling treatment, or (near) infrared cut treatment; can also be performed.

EXAMPLES

The present invention is hereunder described in detail by reference to Examples and Comparative Examples, but it should be construed that the present invention is not limited to these Examples. The above-mentioned components and evaluation methods and the like are as follows.
<Moisture Curable Polyurethane Composition>
[Component A1-1]
  TDI: mixture of tolylene-2,4-diisocyanate (80% by mass) and tolylene-2,6-diisocyanate (20% by mass) (molecular weight: 174)
  MDI: 4,4-diphenylmethanediisocyanate (molecular weight: 250)
  XDI: m-xylylene diisocyanate (molecular weight: 188)
  IPDI: isophorone diisocyanate (isomer mixture) (molecular weight: 222)
[Component A1-2 and Component A3]
  PL1: Duranol manufactured by Asahi Kasei Corporation (polycarbonate diol including 1,5-pentanediol and hexanediol as raw materials, number average molecular weight: 500)
  PL2: polypropylene glycol (number average molecular weight: 400)
  PL3: Duranol manufactured by Asahi Kasei Corporation (polycarbonate diol including 1,5-pentanediol and hexanediol as raw materials, number average molecular weight: 1000)
  PL4: Duranol manufactured by Asahi Kasei Corporation (polycarbonate diol including 1,5-pentanediol and hexanediol as raw materials, number average molecular weight: 2000)
  PL5: polyester polyol including adipic acid and 3-methyl-1,5-pentanediol as raw materials (number average molecular weight: 500)
  PL6: polyester polyol including isophthalic acid and 3-methyl-1,5-pentanediol as raw materials (number average molecular weight: 500)
  PL7: Placcel manufactured by Daicel Corporation (polycaprolactonediol, number average molecular weight: 500)
[Component A2]
  EG: ethylene glycol (molecular weight: 62)
  PG1: 1,2-propanediol (molecular weight: 76)
  PG2: 1,3-propanediol (molecular weight: 76)
  BG: 1,3-butanediol (molecular weight: 90)
  HG: 1,6-hexanediol (molecular weight: 118)
  TMP: trimethylol propane (molecular weight: 134)

[Component A4]
  IPDA: isophorone diamine (isomer mixture)
[Component B (Numbers Shown in the Brackets Represent the Solubility Parameter)]
  B1: diethyl ketone (8.7)
  B2: toluene (8.8)
  B3: ethyl acetate (9.0)
[Other Component]
  L7001: manufactured by Dow Corning Toray Co., Ltd., product name; L7001 (leveling agent)
<Photochromic Monomeric Composition>
[Component D1]
  14G: Polyethylene glycol dimethacrylate (average chain length of ethylene glycol chain: 14, average molecular weight: 736)
  A-400: Polyethylene glycol diacrylate (average chain length of ethylene glycol chain: 9, average molecular weight: 508)
[Component D2]
  TMPT: Trimethylolpropane Trimethacrylate
  D-TMP: Ditrimethylolpropane Tetraacrylate
  SI-1: γ-methacryloyloxypropyltrimethoxysilane
  GMA: Glycidyl methacrylate
  RX-1: Polyrotaxane having a (meth)acryloyl group
    RX-1 was synthesized according to the method described in PCT International Publication No. WO2018/030275. Properties of RX-1 are as follows.
  Mass average molecular weight (Mw) measured by GPC: 880000
  Acryloyl group modification percentage: 85 mol %
  Percentage of hydroxy groups remaining in the side chain: 15 mol %
  Axis molecule; linear polyethylene glycol (PEG) having a molecular weight of 20000
  Inclusion ring; α-cyclodextrin (α-CD) (introduction rate: 0.25)
  End of axis molecule; sealed with adamantane
  Side chain introduced into inclusion ring: (average) molecular weight of the side chain of about 600
[Photochromic Compound]
  PC1: Compound represented by the following formula

[Other components]
  CGI: Phenyl bis(2,4,6-trimethylbenzoyl)-phosphine oxide (product name: Omnirad819 manufactured by IGM) (polymerization initiator)
  HALS: Bis(1,2,2,6,6-pentamethyl-4-piperidyl)sebacate (molecular weight: 508) (UV stabilizer)

HP: Ethylenebis(oxyethylene) bis[3-(5-tert-butyl-4-hydroxy-m-tolyl)propionate] (Irganox 245 manufactured by BASF) (UV stabilizer)

L7001: L7001 manufactured by Dow Corning Toray Co., Ltd. (leveling agent)

Preparation Example 1: Preparation of Moisture Curable Polyurethane Composition (PU1)

To a reaction vessel having a stirrer chip, a cooling tube, a thermometer, a nitrogen gas introduction tube, and a stirrer, TDI (90 g) as a component A1-1, PL1 (130 g) as a component A1-2, and toluene (235 g) as an organic solvent (later to be one component of the component B) were added and mixed uniformly. This mixed solution was adjusted to 90° C. under a nitrogen atmosphere and a prepolymer reaction was carried out to obtain a urethane prepolymer solution.

Furthermore, to the urethane prepolymer solution obtained by the above-mentioned method, PG1 (9.8 g) as a component A2 and ethyl acetate (125 g) as a component B were added, and the mixed solution was adjusted to 75° C. to carry out the reaction.

To the above-mentioned reaction solution, ethyl acetate (360 g) as the component B and L7001 (1.0 g) as another component were further added and stirred under the nitrogen atmosphere until the resulting mixture became uniform to obtain a moisture curable polyurethane composition (PU1). The composition and the like of the moisture curable polyurethane composition (PU1) are shown in Table 1.

(Measurement of Number Average Molecular Weight of Moisture Curable Polyurethane)

The number average molecular weight of the moisture curable polyurethane obtained in Preparation Example 1 was measured by gel permeation chromatography (GPC measurement) under the following conditions. As the apparatus, a liquid chromatograph apparatus (manufactured by Nihon Waters K.K.) was used. As the column, Shodex KD-806M column manufactured by Showa Denko K.K. (elimination limit molecule quantity: 200000000) was used. Furthermore, dimethylformamide (DMF) was used as a developing liquid, and measurement was carried out under the conditions at a flow rate of 1 mL/min and a temperature of 40° C. Then, polyethylene glycol was used as a standard sample, and the number average molecular weight was obtained by comparative conversion. Note here that a differential refractometer was used as a detector. The moisture curable polyurethane was treated with butylamine in advance to inactivate the isocyanate group and then subjected to measurement. The number average molecular weight of the moisture curable polyurethane obtained by this method was 1800.

(Measurement of Content of Isocyanate Group Included in Moisture Curable Polyurethane)

The content of an isocyanate group included in the moisture curable polyurethane was obtained by the reverse titration method of the isocyanate group. The reverse titration of the isocyanate group was carried out by the following procedure.

1) To 500 mL of dehydrated dioxane, 12.5 g of n-butylamine was added and the resulting product was stirred until the resulting mixture was uniform to prepare an n-butylamine/dioxane solution.

2) Into a 110 mL screw tube, 10 mL of the above n-butylamine/dioxane solution was collected using a whole pipette, about 20 mL of THF and 3 drops of bromocresol blue 1% solution in ethanol were added, and titrated in 0.1 mol/L sulfuric acid aqueous solution while stirring. A point at which the color changed from blue to yellowish green or yellow was defined as the end point. A 50 mL burette was used for titration. The measurement was carried out twice to obtain the average value, and the blank value was calculated from the average value (unit: mL).

3) About 1 g of the moisture curable polyurethane composition was weighed to 0.01 g units in a 110 mL screw tube, and about 20 mL of THF and 10 mL of the butylamine/dioxane solution were charged using a whole pipette and stirred until the resulting product was uniform. After the resulting product was found to be uniform, it was titrated in 0.1 mol/L sulfuric acid aqueous solution while stirring.

4) The content of an isocyanate group (amount of NCO) was calculated by the following formula.

$$\text{Amount of } NCO(\text{wt\%}) = \frac{(42.01 \times 0.1 \times 2 \times f \times (\text{Blank Value} - \text{Titrated amount}) \times 100)}{\text{Amount of sample} \times (\text{Solid content concentration}/100) \times 1000}$$

In the formula, f is the potency of 0.1 mol/L sulfuric acid aqueous solution when used for titration, and is 1 in this titration. The solid content concentration was measured by a method described later. The content obtained by this method of the isocyanate group of the moisture curable polyurethane obtained in Preparation Example 1 was 4.7% by mass.

(Calculation of Number of Urethane Bonds Included in Moisture Curable Polyurethane)

The number of urethane bonds included in the moisture curable polyurethane was determined by calculating the number of urethane bonds included in 1 molecule from the mole ratio of each component included in 1 molecule when each component used for production was theoretically reacted, and converting the number to the number of moles included in 100 g of the moisture curable polyurethane. The number of urethane bonds determined by this method of the moisture curable polyurethane obtained in Preparation Example 1 was 0.333 mol/100 g.

(Measurement of Solid Content Concentration in Moisture Curable Polyurethane Composition)

The solid content concentration of the moisture curable polyurethane composition was measured by the following procedure. Firstly, the convection oven was set to 120° C.

1) The weight of the empty container (aluminum cup) was measured to 0.0001 g units (weight 1).

2) A container (aluminum cup) was charged with about 2 g of a moisture curable polyurethane composition and weighed (weight 2) to a unit of 0.0001 g.

3) Drying was carried out for 3 hours in a convection oven set at 120° C.

4) Each container of the moisture curable polyurethane composition after drying was weighed to a unit of 0.0001 g (weight 3), and the solid content concentration was calculated by the following formula.

$$\text{Solid content concentration(wt\%)} = \frac{(\text{Weight 3} - \text{Wight 1})}{\text{Wight 2}}$$

The solid content concentration obtained by this method of the moisture curable polyurethane composition obtained in Preparation Example 1 was 24.2% by mass.

(Measurement of Viscosity of Moisture Curable Polyurethane Composition)

Viscosity of the moisture curable polyurethane composition was measured using a Cannon-Fenske viscometer. In other words, 10 mL of the moisture curable polyurethane composition was weighed with a whole pipette in the Cannon-Fenske viscometer, the Cannon-Fenske viscometer was set in a thermobath kept at 25° C. (25±0.1° C.), and left for 15 minutes, and the kinetic viscosity was obtained. Furthermore, the specific gravity was measured using an areometer, and then viscosity was determined from the product of the dynamic viscosity and the specific gravity. The viscosity determined by this method of the moisture curable polyurethane composition obtained in Preparation Example 1 was 5.2 mPa·s.

Preparation Example 2: Preparation of Moisture Curable Polyurethane Composition (PU2)

TDI (90 g) as the component A1-1, PL2 (103 g) as the component A1-2, and toluene (193 g) as an organic solvent (later, as a component of a component B) were added to a reaction vessel having a stirrer chip, a cooling tube, a thermometer, a nitrogen gas introduction tube, and a stirrer, and the resulting product was mixed homogenously. This mixed solution was adjusted to 90° C. under a nitrogen atmosphere and subjected to a prepolymer reaction to obtain a urethane prepolymer solution.

Furthermore, PG1 (9.8 g) as a component A2 was added to the urethane prepolymer solution obtained by the above method to adjust the temperature to 75° C., and the reaction was carried out.

Ethyl acetate (396 g) as a component B, and L7001 (0.8 g) as another component were further added to the above reaction solution, and the resulting product was stirred under a nitrogen atmosphere until the resulting mixture was uniform to obtain a moisture curable polyurethane composition (PU2). The composition and the like of the moisture curable polyurethane composition (PU2) is shown in Table 1.

Preparation Example 3: Preparation of Moisture Curable Polyurethane Composition (PU3)

TDI (90 g) as the component A1-1, PL2 (103 g) as the component A1-2, and toluene (193 g) as an organic solvent (later, as a component of a component B) were added to a reaction vessel having a stirrer chip, a cooling tube, a thermometer, a nitrogen gas introduction tube, and a stirrer, and the resulting product was mixed homogenously. This mixed solution was adjusted to 90° C. and subjected to a prepolymer reaction to obtain a urethane prepolymer solution.

Furthermore, PG1 (4.9 g) as a component A2 was added to the urethane prepolymer solution obtained by the above method, and the mixed solution was adjusted to 75° C. to carry out the reaction. Furthermore, TMP (8.7 g) as a component A2 and ethyl acetate (117 g) as a component B were added, and the reaction was carried out at 75° C.

To the above reaction solution, ethyl acetate (517 g) as the component B and L7001 (1.1 g) as another component were further added, and the resulting product was stirred under a nitrogen atmosphere until the resulting mixture was uniform to obtain a moisture curable polyurethane composition (PU3). The composition and the like of the moisture curable polyurethane composition (PU3) is shown in Table 1.

TABLE 1

| Moisture curable polyurethane composition | Composition (part by mass) | | | | | Mole ratio when $n_1 = 1$ | | Mole ratio when $n_3 = 1$ |
|---|---|---|---|---|---|---|---|---|
| | Component A1-1 | Component A1-2 | Component A2 | Component B | Other component | $n_2$ | $n_5 + n_6$ | $n_4$ |
| PU1 | TDI (90) | PL1 (130) | PG1 (9.8) | B2 (235) B3 (485) | L7001 (1.0) | 0.50 | 0.00 | 0.50 |
| PU2 | TDI (90) | PL2 (103) | PG1 (9.8) | B2 (193) B3 (396) | L7001 (0.8) | 0.50 | 0.00 | 0.50 |
| PU3 | TDI (90) | PL2 (103) | PG1 (4.9) TMP (8.7) | B2 (193) B3 (634) | L7001 (1.1) | 0.82 | 0.00 | 0.50 |

| Moisture curable polyurethane composition | Physical property of moisture curable polyurethane composition | | Physical property of moisture curable polyurethane | | |
|---|---|---|---|---|---|
| | Solid content concentration (wt %) | Viscosity (mPa · s@25° C.) | Number average molecular weight | Content of NCO (wt %) | Number of urethane bonds (mol/100 g) |
| PU1 | 24.2 | 5.2 | 1800 | 4.7 | 0.333 |
| PU2 | 25.6 | 5.5 | 1650 | 5.1 | 0.364 |
| PU3 | 20.0 | 20.5 | 2200 | 1.8 | 0.545 |

Preparation Examples 4 to 24: Preparation of Moisture Curable Polyurethane Compositions (PU4 to PU24)

Moisture curable polyurethane compositions (PU4 to PU24) were prepared using components shown in Tables 2 to 4 in the same manner as in Preparation Example 1. The compositions and the like of the moisture curable polyurethane compositions (PU4 to PU24) are shown in Tables 2 to 4.

TABLE 2

| Moisture curable polyurethane composition | Composition (part by mass) | | | | | | | Mole ratio when n1 = 1 | | Mole ratio when n3 = 1 |
|---|---|---|---|---|---|---|---|---|---|---|
| | Component A1-1 | Component A1-2 | Component A2 | Component A3 | Component A4 | Component B | Other component | n2 | n5 + n6 | n4 |
| PU4 | TDI (90) | PL3 (260) | PG1 (9.8) | | | B2 (353) B3 (728) | L7001 (1.0) | 0.50 | 0.00 | 0.50 |
| PU5 | TDI (90) | PL4 (520) | PG1 (9.8) | | | B2 (588) B3 (1213) | L7001 (1.0) | 0.50 | 0.00 | 0.50 |
| PU6 | TDI (90) | PL5 (130) | PG1 (9.8) | | | B2 (235) B3 (485) | L7001 (1.0) | 0.50 | 0.00 | 0.50 |
| PU7 | TDI (90) | PL6 (130) | PG1 (9.8) | | | B2 (235) B3 (485) | L7001 (1.0) | 0.50 | 0.00 | 0.50 |
| PU8 | TDI (90) | PL7 (130) | PG1 (9.8) | | | B2 (235) B3 (485) | L7001 (1.0) | 0.50 | 0.00 | 0.50 |
| PU9 | TDI (90) | PL1 (130) | EG (9.8) | | | B2 (235) B3 (485) | L7001 (1.0) | 0.50 | 0.00 | 0.50 |
| PU10 | TDI (90) | PL1 (130) | PG2 (9.8) | | | B2 (235) B3 (485) | L7001 (1.0) | 0.50 | 0.00 | 0.50 |

| Moisture curable polyurethane composition | Physical property of moisture curable polyurethane composition | | Physical property of moisture curable polyurethane | | |
|---|---|---|---|---|---|
| | Solid content concentration (wt %) | Viscosity (mPa · s@25° C.) | Number average molecular weight | Content of NCO (wt %) | Number of urethane bonds (mol/100 g) |
| PU4 | 25.0 | 10.5 | 2800 | 3.0 | 0.214 |
| PU5 | 25.6 | 23.1 | 5000 | 1.7 | 0.120 |
| PU6 | 24.2 | 5.1 | 1800 | 4.7 | 0.333 |
| PU7 | 24.2 | 5.0 | 1800 | 4.7 | 0.333 |
| PU8 | 24.2 | 5.3 | 1850 | 4.5 | 0.324 |
| PU9 | 24.1 | 5.5 | 1880 | 4.5 | 0.319 |
| PU10 | 24.2 | 5.7 | 1880 | 4.5 | 0.319 |

TABLE 3

| Moisture curable polyurethane composition | Composition (part by mass) | | | | | | | Mole ratio when n1 = 1 | | Mole ratio when n3 = 1 |
|---|---|---|---|---|---|---|---|---|---|---|
| | Component A1-1 | Component A1-2 | Component A2 | Component A3 | Component A4 | Component B | Other component | n2 | n5 + n6 | n4 |
| PU11 | TDI (90) | PL1 (130) | BG (9.8) | | | B2 (235) B3 (485) | L7001 (1.0) | 0.50 | 0.00 | 0.50 |
| PU12 | TDI (90) | PL1 (130) | HG (9.8) | | | B2 (235) B3 (485) | L7001 (1.0) | 0.50 | 0.00 | 0.50 |
| PU13 | MDI (129) | PL1 (130) | PG1 (9.8) | | | B2 (235) B3 (485) | L7001 (1.0) | 0.50 | 0.00 | 0.50 |
| PU14 | XDI (97) | PL1 (130) | PG1 (9.8) | | | B2 (235) B3 (485) | L7001 (1.0) | 0.50 | 0.00 | 0.50 |
| PU15 | IPDI (115) | PL1 (130) | PG1 (9.8) | | | B2 (235) B3 (485) | L7001 (1.0) | 0.50 | 0.00 | 0.50 |
| PU16 | TDI (90) | PL1 (130) | PG1 (9.8) | | IPDA (1.0) | B2 (235) B1 (485) | L7001 (1.0) | 0.50 | 0.02 | 0.50 |
| PU17 | TDI (90) | PL1 (130) | PG1 (8.0) | | | B2 (235) B3 (485) | L7001 (1.0) | 0.40 | 0.00 | 0.50 |

| Moisture curable polyurethane composition | Physical property of moisture curable polyurethane composition | | Physical property of moisture curable polyurethane | | |
|---|---|---|---|---|---|
| | Solid content concentration (wt %) | Viscosity (mPa · s@25° C.) | Number average molecular weight | Content of NCO (wt %) | Number of urethane bonds (mol/100 g) |
| PU11 | 24.3 | 6.2 | 1900 | 4.4 | 0.316 |
| PU12 | 24.6 | 7.5 | 1900 | 4.4 | 0.316 |
| PU13 | 27.2 | 8.5 | 2200 | 3.8 | 0.273 |
| PU14 | 24.7 | 6.5 | 1900 | 4.4 | 0.316 |
| PU15 | 26.1 | 4.6 | 2100 | 4.0 | 0.286 |
| PU16 | 24.3 | 9.6 | 2000 | 4.2 | 0.318 |
| PU17 | 24.1 | 4.6 | 1500 | 3.2 | 0.311 |

TABLE 4

| Moisture curable polyurethane composition | Composition (part by mass) | | | | | | | Mole ratio when n1 = 1 | | Mole ratio when n3 = 1 |
|---|---|---|---|---|---|---|---|---|---|---|
| | Component A1-1 | Component A1-2 | Component A2 | Component A3 | Component A4 | Component B | Other component | n2 | n5 + n6 | n4 |
| PU18 | TDI (90) | PL1 (130) | PG1 (6.0) | | | B2 (235) B3 (485) | L7001 (1.0) | 0.30 | 0.00 | 0.50 |
| PU19 | TDI (90) | PL1 (130) | PG1 (4.0) | | | B2 (235) B3 (485) | L7001 (1.0) | 0.20 | 0.00 | 0.50 |
| PU20 | TDI (90) | PL1 (130) | PG1 (11.8) | | | B2 (235) B3 (485) | L7001 (1.0) | 0.60 | 0.00 | 0.50 |

TABLE 4-continued

| Moisture curable polyurethane composition | | | | | | | | | |
|---|---|---|---|---|---|---|---|---|---|
| PU21 | TDI (90) | PL1 (130) | PG1 (13.8) | | B2 (235) B3 (485) | L7001 (1.0) | 0.70 | 0.00 | 0.50 |
| PU22 | TDI (90) | | PG1 (23.5) | | B2 (50) B3 (100) | L7001 (1.0) | 0.60 | 0.00 | 0.00 |
| PU23 | TDI (90) | | PG1 (15.7) | PL1 (65) | B2 (180) B3 (200) | L7001 (1.0) | 0.40 | 0.25 | 0.00 |
| PU24 | TDI (90) | PL1 (155) | PG1 (2.0) | | B2 (235) B3 (485) | L7001 (1.0) | 0.08 | 0.00 | 0.60 |

| Moisture curable polyurethane composition | Physical property of moisture curable polyurethane composition | | Physical property of moisture curable polyurethane | | |
|---|---|---|---|---|---|
| | Solid content concentration (wt %) | Viscosity (mPa·s@25° C.) | Number average molecular weight | Content of NCO (wt %) | Number of urethane bonds (mol/100 g) |
| PU18 | 23.9 | 4.1 | 1300 | 6.5 | 0.286 |
| PU19 | 23.7 | 3.5 | 1100 | 7.6 | 0.273 |
| PU20 | 24.4 | 6.5 | 2300 | 3.7 | 0.348 |
| PU21 | 24.5 | 7.5 | 3200 | 2.6 | 0.354 |
| PU22 | 43.1 | 5.8 | 570 | 14.7 | 0.526 |
| PU23 | 31.0 | 6.5 | 1200 | 7.0 | 0.310 |
| PU24 | 39.4 | 6.5 | 1400 | 6.0 | 0.265 |

Preparation Example 25: Preparation of Moisture Curable Polyurethane Composition (PU25)

A porphyrin compound ("FDB-002" manufactured by Yamada Chemical Co., Ltd., local maximum absorption wavelength: 431 nm, absorption coefficient: 380 L/mol·cm, half-width: 18 nm) (0.03 parts by mass), a benzotriazole-based UV absorber ("SEESORB 703" manufactured by SHIPRO KASEI KAISHA, LTD., local maximum absorption wavelength: 345 nm, absorption coefficient: 50 L/g·cm, half-width: 90 nm) (7 parts by mass), and "Dial Resin BlueJ" manufactured by Mitsubishi Chemical Corporation (local maximum absorption wavelength: 590 nm, absorption coefficient: 35 L/g·cm, half-width: 110 nm) (0.04 parts by mass) were added with respect to the moisture curable polyurethane composition (PU1) (300 parts by mass) and sufficiently stirred and mixed under a nitrogen atmosphere until the resulting mixture was uniform to obtain a moisture curable urethane composition (PU25) having an ultraviolet absorbing ability.

Preparation Example 26: Preparation of Photochromic Composition (1)

Polyethylene glycol dimethacrylate (14G) (average chain length of ethylene glycol chain: 14, average molecular weight: 736) (40 parts by mass), polyethylene glycol diacrylate (A-400) (average chain length of ethylene glycol chain: 9, average molecular weight: 508) (21 parts by mass), trimethylolpropane trimethacrylate (TMPT) (30 parts by mass), RX-1 (3 parts by mass), SI-1 (3 parts by mass), glycidyl methacrylate (GMA) (1 part by mass), photochromic compound PC1 (2 parts by mass), CGI (0.3 parts by mass), HALS (3 parts by mass), HP (1 part by mass), and L7001 (0.1 parts by mass) were added, and the resulting product was mixed and stirred at 70° C. for 15 minutes to obtain a photochromic composition (1) to be used in the coating method. The composition of the photochromic composition (1) is shown in Table 5.

Preparation Example 27: Preparation of Photochromic Composition (2)

A photochromic curable composition (2) was prepared in the same manner as in Preparation Example 26 except that the materials shown in Table 3 were used. The composition of the photochromic composition (1) is shown in Table 5.

TABLE 5

| Photochromic composition No. | Component D1 (part by mass) | Component D2 (part by mass) | Photochromic compound (part by mass) | Other component (part by mass) |
|---|---|---|---|---|
| 1 | 14 G (40) A-400 (21) | TMPT(30) RX-1(3) SI-1(3) GMA(1) | PC1(2) | CGI(0.3) HALS(3) HP(1) L7001(0.1) |

TABLE 5-continued

| Photochromic composition No. | Component D1 (part by mass) | Component D2 (part by mass) | Photochromic compound (part by mass) | Other component (part by mass) |
|---|---|---|---|---|
| 2 | 14 G (50) | TMPT(30)<br>D-TMP(16)<br>SI-1(3)<br>GMA(1) | PC1(2) | CGI(0.3)<br>HALS(3)<br>HP(1)<br>L7001(0.1) |

Example 1

[Formation of Photochromic Resin Layer]

Firstly, a thiourethane-based plastic lens having a center thickness of 2 mm and a refractive index of 1.60 was prepared as an optical base material. Note here that this thiourethane-based plastic lens was subjected to alkaline etching at 50° C. for 5 minutes using a 10% aqueous solution of sodium hydroxide in advance, and then sufficiently washed with distilled water.

Next, using a spin coater (1H-DX2, manufactured by Mikasa Co., Ltd.), a moisture curable primer (product name; TR-SC-P, manufactured by Tokuyama Corporation) was applied to the surface of the above plastic lens at a rotational speed of 70 rpm for 15 seconds, and then 1000 rpm for 10 seconds.

Then, the photochromic composition (1) (2 g) was applied by spin-coating onto the moisture curable primer layer of the optical base material at a rotational speed of 100 rpm for 30 seconds, and then at 800 rpm for 10 to 20 seconds so that the film thickness became 40 μm.

Thereafter, the lens having the above composition applied on the surface thereof was irradiated with light for 80 seconds using a metal halide lamp having an output of 200 mW/cm$^2$ in a nitrogen gas atmosphere to polymerize the above composition. Thereafter, heating was further carried out at 110° C. for 1 hour to form a 40 μm-thick photochromic resin layer made of a resin obtained by polymerizing the photochromic composition (1) on the optical base material.

[Formation of Polyurethane Resin Layer]

Firstly, the optical base material having the above photochromic resin layer thereon was subjected to alkaline etching at 50° C. for 5 minutes using a 10% aqueous solution of sodium hydroxide in advance, and then sufficiently washed with distilled water.

Next, the moisture curable polyurethane composition (PU1) prepared in Preparation Example 1 was applied by spin-coating on the surface of the photochromic resin layer of the optical base material using a spin coater (1H-DX2, manufactured by Mikasa Co., Ltd.), and dried for 10 minutes at 25° C. and 50% RH. At this time, the film thickness of the polyurethane resin layer was set to 2 to 3 μm.

[Evaluation of Photochromic Optical Articles]

The photochromic optical articles obtained above were subjected to each of the following evaluations. The evaluation results are shown in Table 6.

(Photochromic Properties)

The obtained photochromic optical article was used as a sample and irradiated with light from the L-2480 (300 W) SHL-100 xenon lamp of Hamamatsu Photonics K.K. through an aeromass filter (manufactured by Corning Co., Ltd.) at 20±1° C. and a beam strength at 365 nm of 2.4 mW/cm$^2$ and at 245 nm of 24 μW/cm$^2$ on the surface of the photochromic optical article for 120 seconds to develop color so as to measure the photochromic properties.

Maximum absorption wavelength (Amax): The maximum absorption wavelength after color development determined by a spectrophotometer (instantaneous multichannel photodetector MCPD1000) manufactured by Otsuka Electronics Co., Ltd. The maximum absorption wavelength is related to the color tone at the time of color development.

Color optical density {ε(120)−ε(0)}: Difference between the absorbance {ε(120)} after light irradiation for 120 seconds and the absorbance ε(0) before light irradiation at the maximum absorption wavelength. It can be said that the higher this value is, the better the photochromic property is.

Fading speed [t½ (sec.)]: Time needed after 120 seconds of light irradiation, when the light irradiation is stopped, the absorbance at the maximum absorption wavelength of the sample to be deteriorated to ½ of {ε(120)−ε(0)}. It can be said that the shorter this time is, the better the photochromic property is.

(Appearance, etc.)

Evaluation of Appearance (Cracks, Cloudiness)

The obtained photochromic optical article was observed and evaluated under an optical microscope. Evaluation criteria are shown below.

A: Uniform and no appearance defects observed.
B: Very small defect observed in appearance.
C: Partial appearance defect observed.
D: Overall appearance defect observed.

ΔYI Evaluation

YI was measured using a color difference meter SM-4 manufactured by Suga Test Instruments Co., Ltd., and ΔYI was evaluated by the following formula. When the blue protective film is transferred to a photochromic optical article, ΔYI changes.

$$\Delta YI = YI_{24} - YI_0$$

In the formula, $YI_{24}$ is YI after the blue protective film is attached to the obtained photochromic optical article and the film is peeled off after 24 hours, and $YI_0$ is YI before the blue protective film is attached.

Adhesion

Adhesion was evaluated by a cross-cut tape test according to JIS D-0202. In other words, using a retractable knife, the surface of the obtained photochromic optical article was cut in 1 mm interval to form a lattice pattern having 100 squares. A cellophane adhesive tape (CELLOTAPE (registered trademark) manufactured by NICHIBAN Co., Ltd.) was firmly attached, and then tensile peeling was done by pulling to 90° direction from the surface at a time, then a number of squares of the lattice pattern on which the photochromic optical article remained was evaluated.

Examples 2 and 3

A photochromic optical article was produced in the same manner as in Example 1 except that the photochromic composition and the moisture curable polyurethane composition shown in Table 6 were used. The evaluation results of the obtained photochromic optical articles are shown in Table 6.

Example 4

A photochromic optical article was produced in the same manner as in Example 1 except that the moisture curable polyurethane composition (PU1) prepared in Preparation Example 1 was applied on the surface of the photochromic resin layer of the optical base material by spin coating, followed by drying for 10 minutes under the condition of 25° C. 50% RH, and then heating at 90° C. for 3 hours. The evaluation results of the obtained photochromic optical articles are shown in Table 6.

Comparative Example 1

A photochromic optical article was produced in the same manner as in Example 1 except that a moisture curable polyurethane resin layer was not formed. The evaluation results of the obtained photochromic optical articles are shown in Table 6.

TEA: Thioepoxy-based resin plastic lens, refractive index=1.71
TEB: Thioepoxy-based resin plastic lens, refractive index=1.74
PC: Polycarbonate lens with photocurable hard coat layer, refractive index 1.58

Next, using a spin coater (1H-DX2, manufactured by Mikasa Co., Ltd.), the surface of the above plastic lens was coated with the moisture curable polyurethane composition (PU1) at a rotational speed of 70 rpm for 15 seconds, and then at 900 rpm for 10 seconds to form a polyurethane resin layer having a thickness of about 7 μm. Furthermore, the coating was performed at a rotational speed of 70 rpm for 15 seconds and then at 1100 rpm for 10 seconds to form a moisture curable polyurethane resin layer having a thickness of about 5 μm. In other words, one optical base material on which a polyurethane resin layer having a thickness of about 7 μm was formed and one optical base material on which a polyurethane resin layer having a thickness of about 5 μm was formed were produced.

[Formation of Photochromic Resin Layer]

On the polyurethane resin layer of the optical base material obtained by the above method, the photochromic com-

TABLE 6

| No. | Photochromic composition No. | Moisture curable polyurethane composition | Maximum absorption wavelength (λmax) | Color optical density | Fading speed (second) | Appearance | ΔYI | Adhesion |
|---|---|---|---|---|---|---|---|---|
| Example 1 | 1 | PU1 | 585 | 0.88 | 40 | A | −0.5 | 100 |
| Example 2 | 2 | PU2 | 585 | 0.88 | 35 | A | −0.7 | 100 |
| Example 3 | 1 | PU3 | 585 | 0.88 | 40 | A | −0.1 | 100 |
| Example 4 | 1 | PU1 | 585 | 0.88 | 40 | A | 0 | 100 |
| Comparative Example 1 | 1 | — | 585 | 0.88 | 40 | C | −3.9 | 100 |

As is apparent from Table 6, the photochromic optical articles of Examples 1 to 4 in which the protective layer was formed using the moisture curable polyurethane composition are excellent in terms of not only photochromic properties but also in terms of appearance, adhesion, and weather resistance. On the other hand, the photochromic optical article of Comparative Example 1 in which the moisture curable polyurethane composition was not used had insufficient appearance and weather resistance, and was not able to have sufficient physical properties.

Example 5

[Formation of Polyurethane Resin Layer]

As the optical base material, two each of CR, TRB, MRA, MRB, TEA, TEB, and PC having a center thickness of about 2 mm described below were prepared. Note here that these optical base materials were subjected to alkaline etching at 50° C. for 5 minutes in advance using a 10% aqueous solution of sodium hydroxide, and then sufficiently washed with distilled water. Note here that the optical base materials used are as follows.

CR: Allyl-based resin plastic lens, refractive index=1.50
TRB: Urethane-based resin plastic lens, refractive index=1.53
MRA: Thiourethane-based resin plastic lens, refractive index=1.60
MRB: Thiourethane-based resin plastic lens, refractive index=1.67 positions (1) (2 g) prepared in advance were applied by spin coating at a rotational speed of 100 rpm for 30 seconds, and then at 800 rpm for 10 to 20 seconds such that the photochromic composition (1) was spread from the center of the optical base material to the outer periphery with a PET film cut out in a strip shape, and a film thickness was 40 μm.

Then, the lens having a surface coated with the above composition was irradiated with light for 80 seconds using a metal halide lamp having an output of 200 mW/cm² in a nitrogen gas atmosphere to polymerize the composition. Then, heating was further carried out at 110° C. for 1 hour to form a 40 μm-thick photochromic resin layer made of a resin obtained by polymerizing the photochromic composition (1) on the polyurethane resin layer.

[Evaluation of Photochromic Optical Articles]

The photochromic optical article obtained above was evaluated for its photochromic property by the same method as above, and the appearance and boiling adhesion were evaluated by the following method. The evaluation results are shown in Tables 7 to 9.

(Appearance Evaluation)

The photochromic optical article was irradiated with light of a high-pressure mercury lamp, the projection surface was projected on a blank sheet of paper, and the projection surface of the entire photochromic optical article was observed and evaluated. The photochromic optical article was placed at a distance of about 70 cm from the high-pressure mercury lamp and about 20 cm from the blank paper. The evaluation criteria are shown below.

0: No annual ring-shaped defects or less than 5 annual ring-shaped defects are observed, the annual ring-shaped defects occur when a photochromic composition spreads from the center toward the outer peripheral portion of the optical base material.
1: Five or more and less than ten annual ring-shaped defects are observed, the annual ring-shaped defects occur when a photochromic composition spreads from the center toward the outer peripheral portion of the optical base material.
2: Ten of more and less than 20 annual ring-shaped defects are observed on an entire surface, the annual ring-shaped defects occur when the photochromic composition spreads from the center toward the outer peripheral portion of the optical base material.
3: Twenty or more annual ring-shaped defects are observed on an entire surface, the annual ring-shaped defects occur when the photochromic composition spreads from the center toward the outer peripheral portion of the optical base material.

(Boiling Adhesion)

The photochromic optical article was placed in boiling distilled water, and the adhesion between the photochromic resin layer and the lens was evaluated every hour by a cross-cut tape test according to JISD-0202. In other words, using a retractable knife, the surface of the photochromic resin layer was cut in 1 mm interval to form a lattice pattern having 100 squares. A cellophane adhesive tape (CELLO-TAPE (registered trademark) manufactured by NICHIBAN Co., Ltd.) was firmly attached thereto, and tensile peeling was done by pulling to 90° direction from the surface at a time, then a number of squares of the lattice pattern on which the photochromic resin layer remained was measured. As the evaluation result, the test time when the remaining squares were 90 or more was described. For example, the description of 3 hours means that the number of squares remaining in the cross-cut tape test is 90 or more after 3 hours of acceleration and less than 90 after 4 hours of acceleration. Furthermore, when photochromic optical articles having 90 or more squares remains, evaluation was continuously carried out up to 5 hours of acceleration.

Examples 6 to 28

A photochromic optical article was produced in the same manner as in Example 5 except that the moisture curable urethane compositions shown in Tables 7 to 9 were used. However, in order to adjust the film thickness of the polyurethane resin layer to about 7 μm and about 5 μm, conditions such as the rotation speed of the spin coater were appropriately adjusted. The evaluation results of the obtained photochromic optical articles are shown in Tables 7 to 9.

TABLE 7

| No. | Photochromic composition No. | Moisture curable polyurethane composition | Maximum absorption wavelength (λmax) | Color optical density | Fading speed (second) |
| --- | --- | --- | --- | --- | --- |
| Example 5 | 1 | PU1 | 585 | 0.88 | 40 |
| Example 6 | 1 | PU2 | 585 | 0.88 | 40 |
| Example 7 | 1 | PU3 | 585 | 0.88 | 40 |
| Example 8 | 1 | PU4 | 585 | 0.88 | 40 |
| Example 9 | 1 | PU5 | 585 | 0.88 | 40 |
| Example 10 | 1 | PU6 | 585 | 0.88 | 40 |
| Example 11 | 1 | PU7 | 585 | 0.88 | 40 |
| Example 12 | 1 | PU8 | 585 | 0.88 | 40 |
| Example 13 | 1 | PU9 | 585 | 0.88 | 40 |
| Example 14 | 1 | PU10 | 585 | 0.88 | 40 |
| Example 15 | 1 | PU11 | 585 | 0.88 | 40 |
| Example 16 | 1 | PU12 | 585 | 0.88 | 40 |
| Example 17 | 1 | PU13 | 585 | 0.88 | 40 |
| Example 18 | 1 | PU14 | 585 | 0.88 | 40 |
| Example 19 | 1 | PU15 | 585 | 0.88 | 40 |
| Example 20 | 1 | PU16 | 585 | 0.88 | 40 |
| Example 21 | 1 | PU17 | 585 | 0.88 | 40 |
| Example 22 | 1 | PU18 | 585 | 0.88 | 40 |
| Example 23 | 1 | PU19 | 585 | 0.88 | 40 |
| Example 24 | 1 | PU20 | 585 | 0.88 | 40 |
| Example 25 | 1 | PU21 | 585 | 0.88 | 40 |
| Example 26 | 1 | PU22 | 585 | 0.88 | 40 |
| Example 27 | 1 | PU23 | 585 | 0.88 | 40 |
| Example 28 | 1 | PU24 | 585 | 0.88 | 40 |

TABLE 8

| No. | Moisture curable polyurethane composition | Appearance (Polyurethane resin layer: about 7 μm) | | | | | | | Appearance (Polyurethane resin layer: about 5 μm) | | | | | | |
| --- | --- | --- | --- | --- | --- | --- | --- | --- | --- | --- | --- | --- | --- | --- | --- |
| | | CR | TRB | MRA | MRB | TEA | TEB | PC | CR | TRB | MRA | MRB | TEA | TEB | PC |
| Example 5 | PU1 | 0 | 1 | 0 | 0 | 0 | 0 | 0 | 0 | 1 | 0 | 0 | 0 | 0 | 0 |
| Example 6 | PU2 | 1 | 2 | 0 | 0 | 0 | 0 | 0 | 1 | 2 | 0 | 0 | 0 | 0 | 0 |
| Example 7 | PU3 | 1 | 1 | 0 | 0 | 0 | 0 | 0 | 1 | 1 | 0 | 0 | 0 | 0 | 0 |
| Example 8 | PU4 | 1 | 1 | 0 | 0 | 0 | 0 | 0 | 1 | 1 | 0 | 0 | 0 | 0 | 0 |
| Example 9 | PU5 | 1 | 1 | 0 | 0 | 0 | 0 | 0 | 1 | 1 | 0 | 0 | 0 | 0 | 0 |

TABLE 8-continued

| No. | Moisture curable polyurethane composition | Appearance (Polyurethane resin layer: about 7 μm) | | | | | | | Appearance (Polyurethane resin layer: about 5 μm) | | | | | | |
|---|---|---|---|---|---|---|---|---|---|---|---|---|---|---|---|
| | | CR | TRB | MRA | MRB | TEA | TEB | PC | CR | TRB | MRA | MRB | TEA | TEB | PC |
| Example 10 | PU6 | 1 | 1 | 0 | 0 | 0 | 0 | 0 | 1 | 1 | 0 | 0 | 0 | 0 | 0 |
| Example 11 | PU7 | 0 | 0 | 0 | 0 | 0 | 0 | 0 | 0 | 0 | 0 | 0 | 0 | 0 | 0 |
| Example 12 | PU8 | 1 | 2 | 0 | 0 | 0 | 0 | 0 | 1 | 2 | 0 | 0 | 0 | 0 | 0 |
| Example 13 | PU9 | 1 | 2 | 0 | 0 | 0 | 0 | 0 | 1 | 2 | 0 | 0 | 0 | 0 | 0 |
| Example 14 | PU10 | 1 | 2 | 0 | 0 | 0 | 0 | 0 | 1 | 2 | 0 | 0 | 0 | 0 | 0 |
| Example 15 | PU11 | 1 | 1 | 0 | 0 | 0 | 0 | 0 | 1 | 1 | 0 | 0 | 0 | 0 | 0 |
| Example 16 | PU12 | 1 | 2 | 0 | 0 | 0 | 0 | 0 | 1 | 2 | 0 | 0 | 0 | 0 | 0 |
| Example 17 | PU13 | 1 | 2 | 0 | 0 | 0 | 0 | 0 | 1 | 2 | 0 | 0 | 0 | 0 | 0 |
| Example 18 | PU14 | 1 | 1 | 0 | 0 | 0 | 0 | 0 | 1 | 1 | 0 | 0 | 0 | 0 | 0 |
| Example 19 | PU15 | 1 | 2 | 0 | 0 | 0 | 0 | 0 | 1 | 2 | 0 | 0 | 0 | 0 | 0 |
| Example 20 | PU16 | 0 | 1 | 0 | 0 | 0 | 0 | 0 | 0 | 1 | 0 | 0 | 0 | 0 | 0 |
| Example 21 | PU17 | 1 | 1 | 0 | 0 | 0 | 0 | 0 | 1 | 1 | 0 | 0 | 0 | 0 | 0 |
| Example 22 | PU18 | 1 | 2 | 0 | 0 | 0 | 0 | 0 | 1 | 2 | 0 | 0 | 0 | 0 | 0 |
| Example 23 | PU19 | 2 | 2 | 0 | 0 | 0 | 0 | 0 | 2 | 2 | 0 | 0 | 0 | 0 | 0 |
| Example 24 | PU20 | 0 | 0 | 0 | 0 | 0 | 0 | 0 | 0 | 0 | 0 | 0 | 0 | 0 | 0 |
| Example 25 | PU21 | 0 | 0 | 0 | 0 | 0 | 0 | 0 | 0 | 0 | 0 | 0 | 0 | 0 | 0 |
| Example 26 | PU22 | 0 | 1 | 0 | 0 | 0 | 0 | 0 | 0 | 1 | 0 | 0 | 0 | 0 | 0 |
| Example 27 | PU23 | 1 | 1 | 0 | 0 | 0 | 0 | 0 | 1 | 1 | 0 | 0 | 0 | 0 | 0 |
| Example 28 | PU24 | 3 | 3 | 0 | 0 | 1 | 1 | 1 | 3 | 3 | 0 | 0 | 1 | 1 | 1 |

TABLE 9

| No. | Moisture curable polyurethane composition | Boiling adhesion (Polyurethane resin layer: about 7 μm) | | | | | | | Boiling adhesion (Polyurethane resin layer: about 5 μm) | | | | | | |
|---|---|---|---|---|---|---|---|---|---|---|---|---|---|---|---|
| | | CR | TRB | MRA | MRB | TEA | TEB | PC | CR | TRB | MRA | MRB | TEA | TEB | PC |
| Example 5 | PU1 | 5 | 5 | 5 | 5 | 5 | 5 | 5 | 5 | 5 | 5 | 5 | 5 | 5 | 5 |
| Example 6 | PU2 | 5 | 5 | 5 | 4 | 4 | 3 | 5 | 5 | 5 | 5 | 3 | 3 | 2 | 5 |
| Example 7 | PU3 | 5 | 4 | 5 | 3 | 3 | 2 | 5 | 5 | 3 | 5 | 2 | 2 | 1 | 5 |
| Example 8 | PU4 | 5 | 5 | 5 | 4 | 4 | 3 | 5 | 5 | 5 | 5 | 3 | 3 | 2 | 5 |
| Example 9 | PU5 | 5 | 4 | 5 | 3 | 3 | 2 | 5 | 5 | 3 | 5 | 2 | 2 | 1 | 5 |
| Example 10 | PU6 | 5 | 5 | 5 | 5 | 5 | 5 | 5 | 5 | 5 | 5 | 5 | 5 | 5 | 5 |
| Example 11 | PU7 | 5 | 5 | 5 | 5 | 5 | 5 | 5 | 5 | 5 | 5 | 5 | 5 | 5 | 5 |
| Example 12 | PU8 | 5 | 5 | 5 | 4 | 4 | 3 | 5 | 5 | 5 | 5 | 3 | 3 | 2 | 5 |
| Example 13 | PU9 | 5 | 5 | 5 | 4 | 4 | 3 | 5 | 5 | 5 | 5 | 3 | 3 | 2 | 5 |
| Example 14 | PU10 | 5 | 5 | 5 | 4 | 4 | 3 | 5 | 5 | 5 | 5 | 3 | 3 | 2 | 5 |
| Example 15 | PU11 | 5 | 5 | 5 | 5 | 5 | 5 | 5 | 5 | 5 | 5 | 5 | 5 | 5 | 5 |
| Example 16 | PU12 | 5 | 5 | 5 | 4 | 4 | 3 | 5 | 5 | 5 | 5 | 3 | 3 | 2 | 5 |
| Example 17 | PU13 | 5 | 5 | 5 | 4 | 4 | 3 | 5 | 5 | 5 | 5 | 3 | 3 | 2 | 5 |
| Example 18 | PU14 | 5 | 5 | 5 | 5 | 5 | 5 | 5 | 5 | 5 | 5 | 5 | 5 | 5 | 5 |
| Example 19 | PU15 | 5 | 4 | 5 | 3 | 3 | 2 | 5 | 5 | 3 | 5 | 2 | 2 | 1 | 5 |
| Example 20 | PU16 | 5 | 5 | 5 | 5 | 5 | 5 | 5 | 5 | 5 | 5 | 5 | 5 | 5 | 5 |
| Example 21 | PU17 | 5 | 5 | 5 | 5 | 5 | 5 | 5 | 5 | 5 | 5 | 4 | 4 | 3 | 5 |
| Example 22 | PU18 | 5 | 5 | 5 | 4 | 4 | 3 | 5 | 5 | 5 | 5 | 3 | 3 | 2 | 5 |
| Example 23 | PU19 | 5 | 4 | 5 | 3 | 3 | 2 | 5 | 5 | 3 | 5 | 2 | 2 | 1 | 5 |
| Example 24 | PU20 | 5 | 5 | 5 | 5 | 5 | 5 | 5 | 5 | 5 | 5 | 5 | 5 | 5 | 5 |
| Example 25 | PU21 | 5 | 5 | 5 | 5 | 5 | 5 | 5 | 5 | 5 | 5 | 5 | 5 | 5 | 5 |
| Example 26 | PU22 | 5 | 5 | 5 | 5 | 5 | 5 | 5 | 5 | 5 | 5 | 5 | 5 | 5 | 5 |
| Example 27 | PU23 | 5 | 5 | 5 | 5 | 5 | 5 | 5 | 5 | 5 | 5 | 4 | 4 | 3 | 5 |
| Example 28 | PU24 | 5 | 3 | 4 | 1 | 1 | 1 | 4 | 5 | 2 | 2 | 0 | 0 | 0 | 3 |

As is apparent from Tables 7 to 9, the photochromic optical articles of Examples 5 to 28 in which a primer layer was formed using the moisture curable polyurethane composition (in particular, photochromic optical articles of Examples 5 to 27) not only have excellent photochromic properties, but also have excellent appearance and adhesion.

Example 29

[Formation of Polyurethane Resin Layer; Production of First Laminate]

As an optical base material, CR-39 (allyl resin plastic lens; refractive index=1.50) having a thickness of 2.0 mm was used. This optical base material was thoroughly degreased with acetone and immersed in 10% by mass aqueous solution of sodium hydroxide of 50° C. for 10 minutes, then was sufficiently washed by warm water, and dried using a drier at 70° C. for 30 minutes. The moisture curable polyurethane composition (PU25) was applied by spin coating on the optical base material (plastic lens) using a Spin Coater 1H-DX2 manufactured by Mikasa Co., Ltd., then dried for 1 hour under the conditions of 25° C. 50% RH, thereby producing the first laminate having a polyurethane layer on the plastic lens. At this time, a thickness of the polyurethane resin layer was adjusted to 5 to 7 μm.

The obtained first laminate had an appearance of A, adhesion of 100, transmittance of light having wavelength of 400 nm of light of 1%, and transmittance of light having wavelength of 420 nm of 64%. Note here that the appearance and adhesion were evaluated in the same manner as in Example 1, and ultraviolet light absorbing property and blue light absorbing property were evaluated as follows.
(Ultraviolet Absorbing Property and Blue Light Absorbing Property)

The ultraviolet absorbing property and the blue light absorbing property were evaluated by measuring UV-vis spectrum of the obtained first laminate. For the wavelength of the first laminated produced by the method mentioned above, light transmittance (T %) in the wavelength of the wavelength of 400 nm and 420 nm was measured to determine the ultraviolet absorbing property and the blue light absorbing property.
[Formation of Hard Coat Layer; Production of Second Laminate]

t-butanol (12.2 g), ethylene glycol monobutyl ether (7.0 g), acetylacetone (3.7 g), methyltriethoxysilane (0.41 g), γ-glycidoxypropyltrimethoxysilane (18.9 g), and silicone surfactant (Product name: L-7001 manufactured by Dow Corning Toray Co., Ltd.) (0.06 g) were mixed and stirred for 30 minutes at room temperature. Furthermore, 9.0 g of 0.05 N hydrochloric acid was added and stirred for 1 hour. Next, 0.1 N trimethyl ammonium chloride in methanol solution (3.2 g) was further added, and stirred for 1 hour at room temperature. Subsequently, methanol silica sol (solid content concentration: 30% by mass) (44.3 g) and aluminum acetylacetonate (0.51 g) were added and matured for whole day and night, and thereby the hard coat composition was obtained.

The first laminate was immersed in the hard coat composition described above, and pulled out in a pulling rate of 30 cm/min, thereby applying the hard coat composition on both surfaces of the first laminate. After applying, the resulting product was dried at 80° C. for 20 minutes, then maintained and cured at 120° C. for 4 hours to form the hard coat layer. The obtained hard coat layer was a colorless transparent film having a thickness of about 2 μm. The obtained second laminate had an appearance of A, adhesion of 100, transmittance of light having wavelength of 400 nm of 1%, and transmittance of light having wavelength of 420 nm of 64%.

Preparation Examples 28 to 30: Preparation of Moisture Curable Polyurethane Composition (PU26 to PU28)

Moisture curable polyurethane compositions (PU26 to PU28) were prepared using components shown in Table 10 in the same manner as in Preparation Example 1. The compositions and the like of the moisture curable polyurethane compositions (PU26 to PU28) are shown in Table 10.

TABLE 10

| Moisture curable polyurethane composition | Composition (part by mass) | | | | | Mole ratio when $n1 = 1$ | | Mole ratio when $n3 = 1$ |
|---|---|---|---|---|---|---|---|---|
| | Component A1-1 | Component A1-2 | Component A2 | Component B | Other component | n2 | n5 + n6 | n4 |
| PU26 | MDI (129) | PL6 (130) | PG1 (8.0) | B2 (282) B3 (564) | L7001 (1.1) | 0.4049 | 0.00 | 0.50 |
| PU27 | MDI (129) | PL6 (130) | PG1 (11.8) | B2 (361) B3 (722) | L7001 (1.4) | 0.60 | 0.00 | 0.50 |
| PU28 | MDI (129) | PL6 (130) | PG1 (11.8) | B1 (361) B3 (722) | L7001 (1.4) | 0.60 | 0.00 | 0.50 |

| Moisture curable polyurethane composition | Physical property of moisture curable polyurethane composition | | Physical property of moisture curable polyurethane | | |
|---|---|---|---|---|---|
| | Solid content concentration (wt %) | Viscosity (mPa·s@25° C.) | Number average molecular weight | Content of NCO (wt %) | Number of urethane bonds (mol/100 g) |
| PU26 | 24.1 | 6.5 | 1700 | 4.9 | 0.275 |
| PU27 | 20.2 | 5.9 | 2700 | 3.1 | 0.296 |
| PU28 | 20.1 | 5.5 | 2700 | 3.1 | 0.296 |

Examples 30 to 32

A photochromic optical article was produced in the same manner as in Example 5 except that the moisture curable urethane compositions shown in Tables 11 to 13 were used. However, in order to adjust the film thickness of the polyurethane resin layer to about 7 μm and about 5 μm, conditions such as the rotation speed of the spin coater were appropriately adjusted. The evaluation results of the obtained photochromic optical articles are shown in Tables 11 to 13.

TABLE 11

| No. | Photochromic composition No. | Moisture curable polyurethane composition | Maximum absorption wavelength (λmax) | Color optical density | Fading speed (second) |
|---|---|---|---|---|---|
| Example 30 | 1 | PU26 | 585 | 0.88 | 40 |
| Example 31 | 1 | PU27 | 585 | 0.88 | 40 |
| Example 32 | 1 | PU28 | 585 | 0.88 | 40 |

TABLE 12

| No. | Moisture curable polyurethane composition | Appearance (Polyurethane resin layer: about 7 μm) | | | | | | | Appearance (Polyurethane resin layer: about 5 μm) | | | | | | |
|---|---|---|---|---|---|---|---|---|---|---|---|---|---|---|---|
| | | CR | TRB | MRA | MRB | TEA | TEB | PC | CR | TRB | MRA | MRB | TEA | TEB | PC |
| Example 30 | PU26 | 0 | 1 | 0 | 0 | 0 | 0 | 0 | 1 | 1 | 0 | 0 | 0 | 0 | 0 |
| Example 31 | PU27 | 0 | 0 | 0 | 0 | 0 | 0 | 0 | 0 | 0 | 0 | 0 | 0 | 0 | 0 |
| Example 32 | PU28 | 0 | 0 | 0 | 0 | 0 | 0 | 0 | 0 | 0 | 0 | 0 | 0 | 0 | 0 |

TABLE 13

| No. | Moisture curable polyurethane composition | Boiling adhesion (Polyurethane resin layer: about 7 μm) | | | | | | | Boiling adhesion (Polyurethane resin layer: about 5 μm) | | | | | | |
|---|---|---|---|---|---|---|---|---|---|---|---|---|---|---|---|
| | | CR | TRB | MRA | MRB | TEA | TEB | PC | CR | TRB | MRA | MRB | TEA | TEB | PC |
| Example 30 | PU26 | 5 | 5 | 5 | 5 | 5 | 5 | 5 | 5 | 5 | 5 | 5 | 5 | 5 | 5 |
| Example 31 | PU27 | 5 | 5 | 5 | 5 | 5 | 5 | 5 | 5 | 5 | 5 | 5 | 5 | 5 | 5 |
| Example 32 | PU28 | 5 | 5 | 5 | 5 | 5 | 5 | 5 | 5 | 5 | 5 | 5 | 5 | 5 | 5 |

As is apparent from Tables 11 to 13, the photochromic optical articles of Examples 30 to 32 in which a primer layer was formed using the moisture curable polyurethane composition not only have excellent photochromic properties, but also have excellent appearance and adhesion.

Example 33

(1) Production of Polycarbonate Sheet to which Urethane Resin Layer is Laminated Isophorone diisocyanate, polycarbonate diol (molecular weight: 1000), and urethane resin made from isophorone diamine as a raw material were dissolved in propylene glycol monomethyl ether as an organic solvent such that a solid content concentration became 15% by mass. The resulting urethane resin solution was applied to a thickness of 10 μm onto a 300 μm-thick polycarbonate sheet, followed by drying at 110° C. for 5 minutes to produce a laminated sheet.

(2) Formation of Resin Layer Using Moisture Curable Polyurethane Composition

A moisture curable polyurethane composition (PU7) was applied to have a thickness of 7 μm onto a PET separate film, followed by drying at 100° C. for 5 minutes to form a resin layer.

(3) Production of Laminated Sheet

A urethane resin layer of the laminated sheet obtained in the above (1) was heated and pressed at 0.1 MPa at 100° C. on the resin layer formed from the moisture curable urethane composition obtained in the above (2). Next, the PET separate film was peeled off, and the urethane resin layer of the laminated sheet obtained in the above (1) was heated and pressed to the resin layer on the other side at 0.1 MPa and at 100° C. to produce a laminated sheet.

(4) Measurement of Peel Strength

The laminated sheet obtained in the above (3) was used as a test piece having an adhesive portion of 25×100 mm and mounted on a tensile tester (Autograph AGS-500NX, manufactured by Shimadzu Corporation), the tensile test was carried out at a crosshead speed of 100 mm/min, and the peel strength was measured. The measurement results are shown in Table 14.

Examples 34 to 36

The peel strength was measured in the same manner as in Example 33 except that the moisture curable polyurethane composition shown in Table 14 was used. The measurement results are shown in Table 14.

TABLE 14

| | Moisture curable polyurethane composition | Peel strength (N/25 mm) |
|---|---|---|
| Example 33 | PU7 | 100 |
| Example 34 | PU13 | 70 |
| Example 35 | PU27 | 130 |
| Example 36 | PU24 | 10 |

The invention claimed is:
1. A laminate comprising:
an optical base material;
a polyurethane resin layer formed from a moisture curable polyurethane composition; and
a photochromic resin layer comprising a photochromic compound, wherein an order of lamination is the polyurethane resin layer, the photochromic resin layer, and the optical base material, the moisture curable polyurethane composition comprises:

a moisture curable polyurethane (A); and an organic solvent (B), the moisture curable polyurethane (A) being a moisture curable polyurethane having an isocyanate group at the end of a molecule thereof, the moisture curable polyurethane being obtained by reacting a polyisocyanate compound (A1) having two or more isocyanate groups in a molecule thereof with a low molecular weight polyol compound (A2) having two or more hydroxy groups in a molecule thereof and having a number average molecular weight of 50 to 300.

2. The laminate according to claim 1, wherein the polyisocyanate compound (A1) having two or more isocyanate groups in a molecule thereof is an aromatic polyisocyanate compound having two or more isocyanate groups in a molecule thereof.

3. The laminate according to claim 1, wherein the polyisocyanate compound (A1) having two or more isocyanate groups in a molecule thereof is an urethane prepolymer having an isocyanate group at the end of a molecule thereof, the polyisocyanate compound (A1) being obtained by reacting a polyisocyanate compound (A1-1) having two or more isocyanate groups in a molecule thereof and having a molecular weight of 400 or less with a high molecular weight polyol compound (A1-2) having two or more hydroxy groups in a molecule thereof and having a number average molecular weight of 300 to 5000.

4. The laminate according to claim 1, wherein the organic solvent (B) is an organic solvent having a solubility parameter of 8 $[(cal/cm^3)^{1/2}]$ or more and has no active hydrogen.

5. The laminate according to claim 1, wherein the moisture curable polyurethane (A) is a moisture curable polyurethane having an isocyanate group at the end of a molecule thereof, the moisture curable polyurethane (A) being obtained by further reacting at least one selected from a polyol compound (A3) having two or more hydroxy groups in a molecule thereof and having a number average molecular weight of 400 to 2000 and an amine compound (A4) having one or more amino groups in a molecule thereof.

* * * * *